(12) United States Patent
Yoshida et al.

(10) Patent No.: US 6,292,448 B1
(45) Date of Patent: Sep. 18, 2001

(54) INFORMATION RECORDING APPARATUS

(75) Inventors: Masayoshi Yoshida; Yoshitaka Shimoda, both of Meguro-ku (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/360,903

(22) Filed: Jul. 26, 1999

(30) Foreign Application Priority Data

Jul. 27, 1998 (JP) .................................................. 10-211097

(51) Int. Cl.[7] ....................................................... G11B 7/00
(52) U.S. Cl. .................. 369/53.27; 369/116; 369/53.15; 369/47.53; 369/47.5
(58) Field of Search .............................. 369/116, 53.15, 369/53.26, 53.27, 47.5, 47.52, 47.53

(56) References Cited

U.S. PATENT DOCUMENTS

| | | | |
|---|---|---|---|
| 5,305,296 | * | 4/1994 | Kono ................................. 369/53.27 |
| 5,706,271 | * | 1/1998 | Hashimoto ........................... 369/116 |
| 5,737,289 | * | 4/1998 | Udagawa ............................. 369/116 |
| 5,898,655 | * | 4/1999 | Takahashi .......................... 369/47.53 |
| 6,067,284 | * | 5/2000 | Ikeda et al. ........................... 369/116 |

* cited by examiner

Primary Examiner—Thang V. Tran
(74) Attorney, Agent, or Firm—Pitney, Hardin, Kipp & Szuch LLP

(57) ABSTRACT

Before information is recorded onto an information record medium by irradiating a light beam, a test signal is recorded for each of a plurality of unit test record regions with a plurality of different record powers. Then, the test signal recorded in each of the unit test record regions is reproduced, and further an optimal record power for the light beam is selected on the basis of a condition of the reproduced test signal. The information recording apparatus is provided with: a re-writable memory device for storing power set values to obtain the plurality of different record powers respectively, in response to location information which identifies respective one of the unit test record regions; a recording device for recording the test signal in the test record region on the basis of a constant record clock signal; a location information generating device for generating the location information at a cycle corresponding to a record time for each of the unit test record regions; a record controlling device for reading out the power set value stored in the re-writable memory device in accordance with the generated location information and then outputting it to the recording device; a defect detecting device for detecting a defect in respective one of the unit test record regions, in which a recording operation is performed; and a power set value storing device for storing the power set value, which is read out in accordance with one location information when the defect is detected, into the re-writable memory device such that the stored power set value corresponds to another location information.

5 Claims, 22 Drawing Sheets

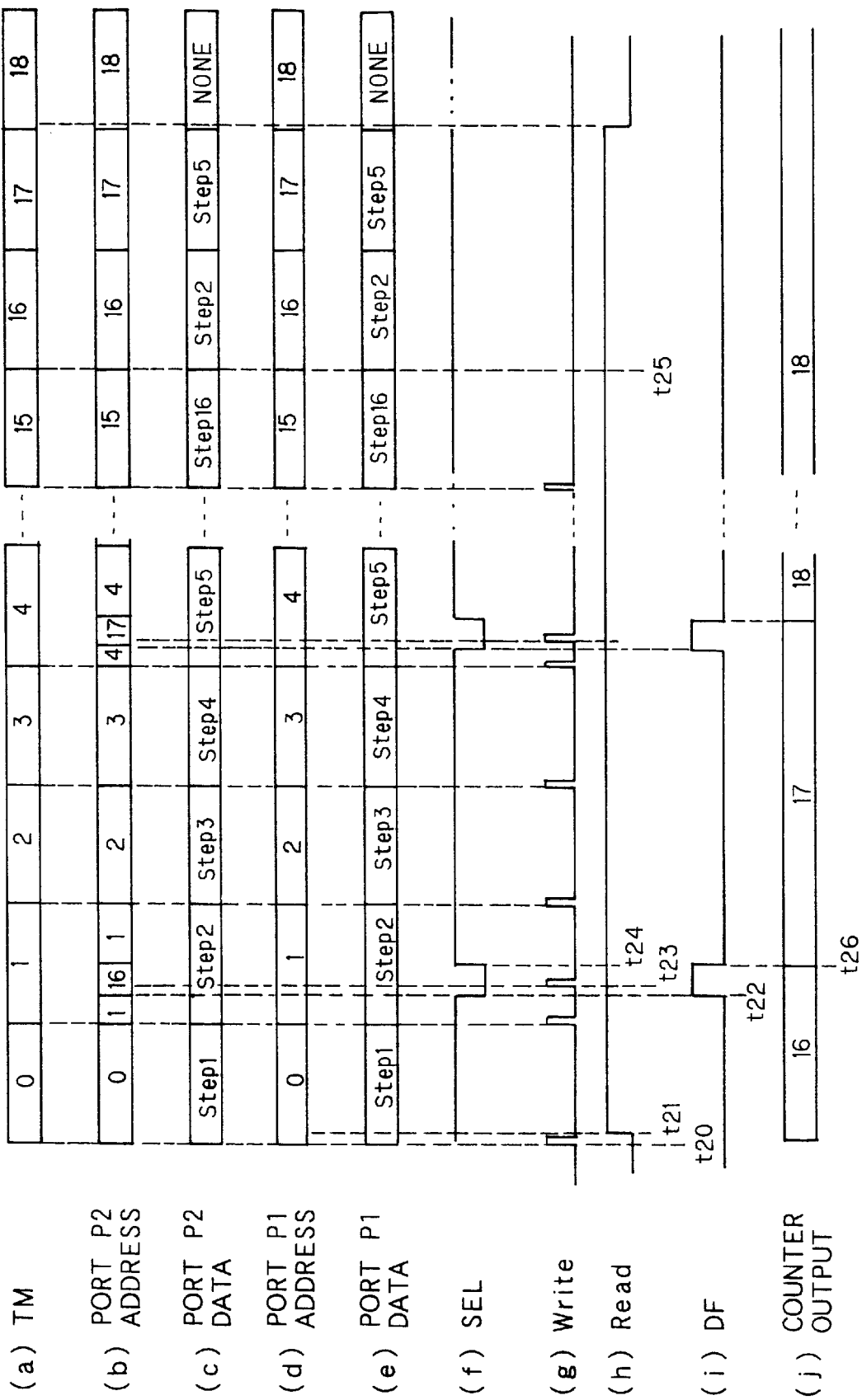

FIG. 19

| ADDRESS | POWER SET VALUE |
|---|---|
| 1 | Step 1 |
| 2 | Step 2 |
| 3 | Step 3 |
| 4 | Step 4 |
| 5 | Step 5 |
| 6 | Step 6 |
| 7 | Step 7 |
| 8 | Step 8 |
| 9 | Step 9 |
| 10 | Step 10 |
| 11 | Step 11 |
| 12 | Step 12 |
| 13 | Step 13 |
| 14 | Step 14 |
| 15 | Step 15 |
| 16 | Step 16 |

INFORMATION RECORDING APPARATUS

BACKGROUND OF THE INVENTION

1. Field of the Invention

The present invention relates to an information record medium for automatically determining a record power with respect to the information record medium such as an optical disc, and recording the information thereon.

2. Description of the Related Art

There is a write once (WO: Write Once) type optical disc, in which information can be written to the same location only once by using a condition change of organic pigment, as an optical record medium capable of postscript-writing.

For example, triphenyl-methane type pigment, fluoran type pigment, cyanine type pigment or the like is used as a record material, in the write once type optical disc using the organic pigment for the record film. By using those record materials, a pit is formed by the rear flow mechanism in which a vapor pressure in the vicinity of the surface of a record portion made from the record material is increased by the radiation of a light beam and the like, and this vapor pressure causes a fused portion to be peripherally expanded, which can correspond to "1" or "0" of digital data.

By the way, in the optical disc using the organic type pigment, a temperature at which the above-mentioned rear flow is induced is different depending on the record material. Thus, a power (electric power) of the light beam irradiated to form the pit is different for each kind of optical disc.

Therefore, in order to record the information onto the optical disc using the organic type pigment, a laser power optimal for the optical disc of each kind is encoded and recorded on a part of the optical disc, for example, a control track or a lead in area.

However, even if the same record material is used, the performance may be slightly different for each individual disc, in many cases. For this reason, the optimal laser power may not be irradiated onto the individual optical disc, if the laser power is uniformly applied for each kind of the optical disc.

That is, if the laser power is uniformly applied to the same type of optical disc as in the conventional technique, the influence resulting from the change of ambient environment, the change of record/reproduction performance for each optical disc or the like leads to a trouble that the information cannot be stably recorded.

So, a calibration of the laser power may be carried out prior to the actual start of the recording operation. In this calibration, a test signal is recorded on a test record region, which is prepared on the optical disc, by gradually changing the laser power, and the recorded test signal is reproduced. Then, the information is actually recorded at a record power which is obtained by the calibration to be optimal for the combination of a recorder and a record medium.

However, the record medium may have a defect caused by crack, dust and the like. The existence of such a defect on a location to which the test signal is written results in a problem that the signal quality of a record signal (i.e. the test signal) cannot be checked correctly.

In short, even if the test signal is recorded at the record power which is supposed to be optimal, when the defect is present on the recorded location, the reproduction signal for the test signal is not admitted to be the optimal signal. Thus, the record power used to record this test signal is not set as the optimal record power. On the contrary, although the test signal is not recorded at the optimal record power, the defect may cause the reproduction signal for this test signal to be admitted to be the optimal signal, and also cause a non-optimal record power to be erroneously set as the optimal record power. As a result, even if such a calibration has been performed, there may be a case where the information is not actually recorded at the record power optimal for the combination of the recorder and the record medium.

On the other hand, the recording operation with the optimal record power may not be performed not only in a case that the defect is present at the record position but also in a case that an abnormal condition in the servo system e.g., an external disturbance is generated at the time of recording.

SUMMARY OF THE INVENTION

The present invention is proposed in view of the above mentioned problems. It is therefore an object of the present invention to provide an information recording apparatus, which can set an optimal record power irrespectively of the presence or absence of a detect in a test record region of an information record medium, and also in a case that the external disturbance is generated.

The above object of the present invention can be achieved by a first information recording apparatus, in which before information is recorded onto an information record medium by irradiating a light beam, a test signal is recorded for each of a plurality of unit test record regions forming a test record region on the information record medium, with a plurality of different record powers, and then the test signal recorded in each of the unit test record regions is reproduced, and further an optimal record power for the light beam is selected on the basis of a condition of the reproduced test signal. The first information recording apparatus is provided with: a re-writable memory device for storing power set values to obtain the plurality of different record powers respectively, in response to location information which identifies respective one of the unit test record regions; a recording device for recording the test signal in the test record region on the basis of a constant record clock signal; a location information generating device for generating the location information at a cycle corresponding to a record time for each of the unit test record regions; a record controlling device for reading out the power set value stored in the re-writable memory device in accordance with the generated location information and then outputting the read out power set value to the recording device; a defect detecting device for detecting a defect in respective one of the unit test record regions, in which a recording operation is performed by the recording device; and a power set value storing device for storing the power set value, which is read out in accordance with one location information by the record controlling device when the defect is detected, into the re-writable memory device such that the stored power set value corresponds to another location information different from the one location information.

According to the first information recording apparatus, at first the location information identifying the respective one of the unit test record regions is generated at a cycle corresponding to a record time for each of the unit test record regions by the location information generating device. Then, the power set value stored in the re-writable memory device is read out by the record controlling device in accordance with the generated location information, and is outputted to the recording device. Then, the test signal is recorded by the recording device on the basis of a constant record clock signal, with the record power based on the power set value for each of the unit test record regions, which is identified by the location information in the test record region prepared on the information record medium. Since the power set value is set so that the record power different for each of the unit test record regions can be obtained, by reproducing the test signal for each of the unit test record regions after recording the test signal in the above mentioned manner, it is possible to evaluate the reproduction conditions of the test signals in accordance with the respective record powers, so that the optimal record power of the light beam can be selected on the basis of this evaluation. Further, when the defect in the unit test record region in which the recording operation is performed is detected by the defect detecting device, the power set value read out by the record controlling device on the basis of one location information which identifies the unit test record region is stored into the re-writable memory device by the power set value storing device, so that the stored power set value corresponds to another location information which is different from this one location information. Even if the test signal is recorded in the unit test record region, which is identified by one location information, on the basis of the predetermined power set value corresponding to this one location information, since a defect is present in this unit test record region, the reproduction condition of the test signal here cannot appropriately reflect the predetermined power set value corresponding to this one location information. However, the predetermined power set value corresponding to this one location information is stored into the re-writable memory device as the predetermined power set value corresponding to another location information which is different from this one location information. Accordingly, recording the test signal based on this predetermined power set value is performed in the unit test record region where the defect is not present which is identified by this another location information. Therefore, by reproducing the test signal in the unit test record region where the defect is not present which is identified by this another location information, it is possible to appropriately evaluate the reproduction condition of the test signal corresponding to the record power based on this predetermined power set value. As described above, according to the first information recording apparatus of the present invention, even if a defect is present in the unit test record region, it is possible to appropriately evaluate the reproduction condition of the test signal corresponding to the record power based on respective one of the power set values, so that the optimal record power of the light beam can be selected on the basis of the evaluation result.

Further, since the record region of the test signal is changed only when the defect is detected, the test signal recorded on the usual test record region can be effectively used for the evaluation of the optimal record power to thereby save the test record region. Moreover, even if the defect is detected, all the test signals are not always re-written. Therefore, it is possible to shorten the time necessary for the power calibration process.

In one aspect of the first information recording apparatus of the present invention, N (N: natural number) different power set values are stored in the re-writable memory device in correspondence with N location information for identifying N unit test record regions respectively, and the power set value storing device stores the power set value into the re-writable memory device such that the stored power set value corresponds to the location information, which identifies $M^{th}$ ($M \geq N+1$) unit test record region, when the defect is detected.

According to this aspect, the N different power set values, which correspond to the N location information for identifying N unit test record regions respectively, are read out from the re-writable memory device. Then, the test signals are recorded with the record powers based on the different power set values into the $1^{st}$ to $N^{th}$ unit test record regions. Also, the power set value which is read out when the defect is detected, is stored into the re-writable memory device by the power set value storing device, so that the power set value corresponds to the location information identifying the $M^{th}$ ($M \geq N+1$) unit test record region. Therefore, since recording the test signal based on the power set value read out when the defect is detected is performed in the $M^{th}$ ($M \geq N+1$) unit test record region where the defect is not present, it is possible to appropriately evaluate the test signal based on the power set value.

In another aspect of the first information recording apparatus of the present invention, N (N: natural number) different power set values are stored in the re-writable memory device in correspondence with N location information for identifying N unit test record regions respectively, and the power set value storing device stores the power set value into the re-writable memory device such that the stored power set value corresponds to the location information, which identifies another unit test record region next to one unit test record region in which the defect is detected, when the defect is detected.

According to this aspect, the N different power set values, which correspond to the N location information for identifying N unit test record regions respectively, are read out from the re-writable memory device. Then, the test signals are recorded with the record powers based on the different power set values into the $1^{st}$ to $N^{th}$ unit test record regions. Also, the power set value which is read out when the defect is detected, is stored into the re-writable memory device by the power set value storing device, so that the power set value corresponds to the location information identifying the next unit test record region, which is next to the unit test record region in which the defect is detected. Therefore, since recording the test signal based on the power set value read out when the defect is detected is performed in the next unit test record region where the defect is not present, it is possible to appropriately evaluate the test signal based on the power set value.

The above object of the present invention can be also achieved by a second information recording apparatus, in which before information is recorded onto an information record medium by irradiating a light beam, a test signal is recorded for each of a plurality of unit test record regions forming a test record region on the information record medium, with a plurality of different record powers, and then the test signal recorded in each of the unit test record regions is reproduced, and further an optimal record power for the light beam is selected on the basis of a condition of the reproduced test signal. The second information recording apparatus is provided with: a re-writable memory device for storing power set values to obtain the plurality of different record powers respectively, in response to location information which identifies respective one of the unit test record regions; a recording device for recording the test signal in the test record region on the basis of a constant record clock signal; a location information generating device for generating the location information at a cycle corresponding to a record time for each of the unit test record regions; a record controlling device for reading out the power set value stored in the re-writable memory device in accordance with the generated location information and then outputting the read out power set value to the recording device; a judging device for reading out a recorded content for respective one of the unit test record regions and judging whether or not a normal recording operation is performed by the recording device; and a power set value storing device for reading out the power set value from the re-writable memory device in accordance with one location information corresponding to the unit test record region if the judging device judges that the normal recording operation is not performed therein, and storing the read out power set value into the re-writable memory device such that the stored power set value corresponds to another location information different from the one location information.

According to the second information recording apparatus, at first the location information identifying the respective one of the unit test record regions is generated at a cycle corresponding to a record time for each of the unit test record regions by the location information generating device. Then, the power set value stored in the re-writable memory device is read out by the record controlling device in accordance with the generated location information, and is outputted to the recording device. Then, the test signal is recorded by the recording device on the basis of a constant record clock signal, with the record power based on the power set value for each of the unit test record regions, which is identified by the location information in the test record region prepared on the information record medium. Since the power set value is set so that the record power different for each of the unit test record regions can be obtained, by reproducing the test signal for each of the unit test record regions after recording the test signal in the above mentioned manner, it is possible to evaluate the reproduction conditions of the test signals in accordance with the respective record powers, so that the optimal record power of the light beam can be selected on the basis of this evaluation. Further, the judging device judges whether or not the normal recording operation has been performed in the unit test record area where the recording is to be performed. When the judging device judges that the normal recording operation has never been performed, the power set value read out by the record controlling device on the basis of one location information which identifies the unit test record region is stored into the re-writable memory device by the power set value storing device, so that the stored power set value corresponds to another location information which is different from this one location information. Even if the test signal is recorded in the unit test record region, which is identified by one location information, on the basis of the predetermined power set value corresponding to this one location information, since the normal recording operation has never been performed in this unit test record region due to the external disturbance, the defect or the like, the reproduction condition of the test signal here cannot appropriately reflect the predetermined power set value corresponding to this one location information. However, the predetermined power set value corresponding to this one location information is stored into the re-writable memory device as the predetermined power set value corresponding to another location information which is different from this one location information. Accordingly, recording the test signal based on this predetermined power set value is performed in the unit test record region where the defect is not present which is identified by this another location information. Therefore, by reproducing the test signal in the unit test record region where the defect is not present which is identified by this another location information, it is possible to appropriately evaluate the reproduction condition of the test signal corresponding to the record power based on this predetermined power set value. As described above, according to the first information recording apparatus of the present invention, even if the normal recording operation has never been performed in the unit test record region, it is possible to appropriately evaluate the reproduction condition of the test signal corresponding to the record power based on respective one of the power set values, so that the optimal record power of the light beam can be selected on the basis of the evaluation result.

Further, according to the second information recording apparatus of the present invention, not only when the defect is detected but also when the normal recording operation is not performed into the test record region of the DVD-R due to the abnormality of the servo system e.g., the generation of the external disturbance, it is performed to record the test signal on the basis of the power set value same as the power set value used at the time of recording, so that it is possible to appropriately perform the selection of the optimal power.

In one aspect of the second information recording apparatus of the present invention, the record controlling device includes a device for reading out the power set values and outputting the read out power set values to the recording device as for the plurality of unit test record regions respectively and for performing a re-reading out operation of the power set value and a re-outputting operation to the recording device if the judging device judges that the normal recording operation is not performed, and the judging device includes a device for reading out the recorded content for respective one of the unit test record regions and judging after the recording device finishes the recording operation with respect to the plurality of unit test record regions by the recording device.

According to this aspect, the power set values are read out and are outputted to the recording device as for the plurality of unit test record regions respectively by the record controlling device. As a result, the data recording operations with the power set values into the plurality of unit test record regions respectively are performed by the recording device. When the recording operations of the data with respect to the unit test record regions by the recording device are finished, the judging device reads out the record content of respective one of the unit test record regions, and judges whether or not the normal recording operation has been performed. As a result, if the judging device judges that the normal recording operation has never been performed, the power set value is read out again by the record controlling device, and is outputted again to the recording device. As described above, if the judging device judges that the normal recording operation has never been performed, the power set value storing device reads out the power set value from the rewritable memory device on the basis of one location information corresponding to this unit test record region, and stores it into the re-writable memory device such that the stored power set value corresponds to another location information which is different from this one location information. Therefore, the power set values related to the above mentioned reading again operation includes the power set value stored into the re-writable memory device which corresponds to another location information which is different from this one location information. As a result, the power set value, which is used for the unit test record region in which the normal recording operation has never been performed, is used for recording the test signal in the unit test record region which is identified by this another location information. Consequently, by reproducing this test signal, it is possible to appropriately evaluate the reproduction condition of the test signal in correspondence with the record power based on the power set value.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 16 is a timing chart showing the operations of the power set memory in the process of outputting the power set data in the first embodiment of the present invention;

FIG. 19 is a diagram showing a power set value table stored in a control judging section in the second embodiment of the present invention;

DETAILED DESCRIPTION OF THE PREFERRED EMBODIMENTS

Preferred embodiments of the present invention will be explained below with reference to the attached drawings.

(I) First Embodiment ((DVD-R))

Figure 1:
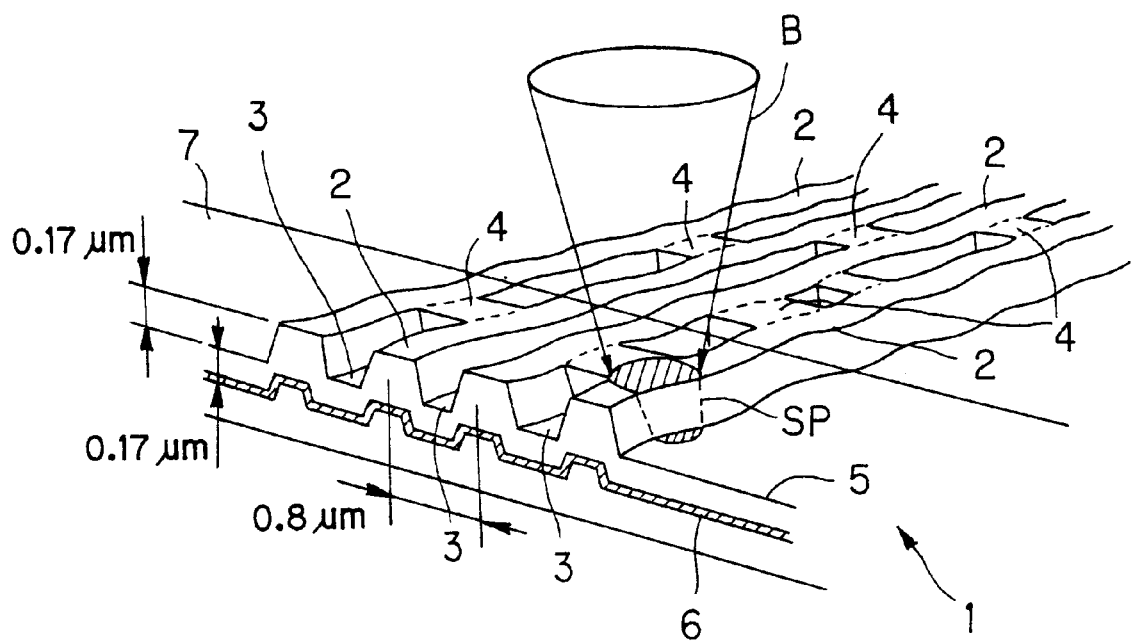
FIG. 1 is a perspective view showing a structure of a record layer of a DVD-R used in embodiments of the present invention.

At first, the structure of a DVD-R is described. FIG. 1 is a perspective view showing an example of the structure of the DVD-R used in embodiments of the present invention.

In FIG. 1, a DVD-R 1 is a pigment type DVD-R, which has a pigment film 5 and to which information can be written only once. The DVD-R 1 is provided with a groove track 2 serving as one example of an information record track and a land track 3 serving as one example of a guide track to guide into the groove track 2 a light beam B, such as laser beam or the like, serving as one example of a reproduction light or a record light.

Also, it is provided with a protection film 7 for protecting them and a gold deposition surface 6 for reflecting the light beam B when the recorded information is reproduced. Then, a pre-pit 4 corresponding to pre-information of the DVD-R 1 is formed on this land track 3. This pre-pit 4 is formed in advance in a process of manufacturing the DVD-R 1.

Moreover, in the DVD-R 1, the groove track 2 is wobbled at a frequency corresponding to a rotation speed of the DVD-R 1. An operation of recording the rotation control information through the wobbling of the groove track 2 is carried out in advance in the process of manufacturing the DVD-R 1, similarly to the pre-pit 4.

Then, when the record information (hereafter, this implies information which is primarily recorded, such as video information and the like, other than the pre-information) is recorded on the DVD-R 1, an information recording apparatus described later detects the frequency of the wobbling of the groove track 2 and thereby obtains the rotation control information, so as to control the rotation of the DVD-R 1 at a predetermined rotation speed. The information recording apparatus also detects the pre-pit 4 and thereby obtains in advance the pre-information of the DVD-R 1 so as to set an optimal output and the like of the light beam B serving as one example of the record light in accordance with an optimal output information included in the pre-information. The information recording apparatus further records the record information on a corresponding record location in accordance with the address information included in the pre-information.

When the record information is recorded, it is recorded by irradiating the light beam B so that a center thereof coincides with a center of the groove track 2 and then forming a record information pit corresponding to the record information on the groove track 2. At this time, a size of a light spot SP is set such that a part thereof is irradiated onto the land track 3 as well as the groove track 2, as shown in FIG. 1.

The reflection light of the light spot SP irradiated onto this groove track 2 and the land track 3 is used to detect a composite signal in which a pre-pit signal is superimposed on a wobble signal by using a push-pull method (i.e., a push-pull method using a light detector divided by a division line parallel to a rotation direction of the DVD-R 1 (hereafter, referred to as a radial push-pull method)). Moreover, the pre-information is obtained which is detected from a pre-pit signal component in the composite signal. Also, a clock signal for the rotation control and the record control is obtained from a wobble signal component.

Figure 2:
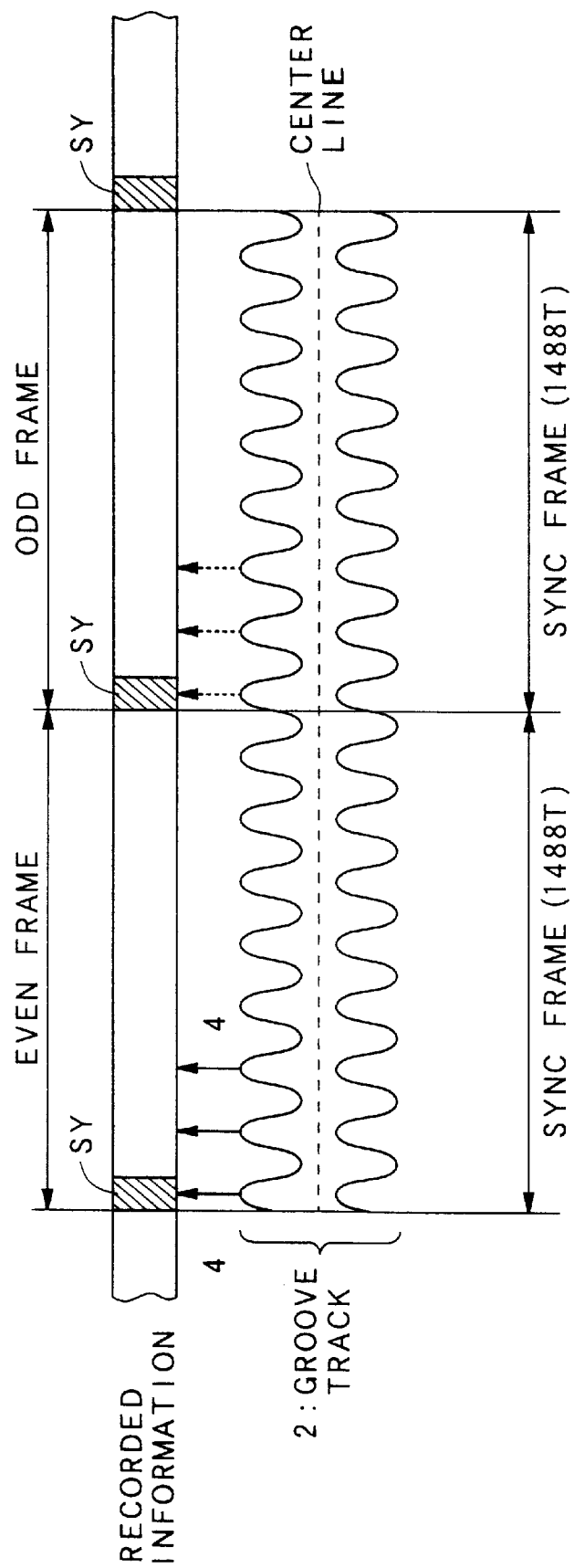
FIG. 2 is a diagram showing relationships between a groove track, data of a synchronization frame system to be written onto the groove track and a pre-pit formed on a land track in the DVD-R.

Next, the record format of the rotation control information and the pre-information recorded in advance on the DVD-R 1 in this embodiment will be described below with reference to FIG. 2. In FIG. 2, an upper stage shows a record format in the record information, and a wave form at a low stage shows a wobbling state of the groove track 2 for recording the record information (corresponding to a plan view of the groove track 2), and each upward arrow between the wobbling state of the groove track 2 and the record information diagrammatically indicates a location on which the pre-pit 4 is formed. Here, in FIG. 2, the wobbling state of the groove track 2 is indicated by using an amplitude larger than an actual amplitude, for easy understanding, and the record information is recorded on a central line of the groove track 2.

As shown in FIG. 2, in this embodiment, the record information to be recorded onto the DVD-R 1 is divided for each synchronization frame serving as one example of an information unit, in advance. Then, one recording sector is composed of 26 synchronization frames. Moreover, one ECC (Error Correcting Code) block is composed of 16 recording sectors. In addition, one synchronization frame has a length equal to 1488T times (1488T) of the unit length (hereafter, referred to as T) corresponding to a bit interval prescribed by the record format when the record information is recorded. Moreover, a synchronization information SY necessary for the synchronization for each synchronization frame is recorded on a portion of a length corresponding to a lead 14T of one synchronization frame.

On the other hand, the pre-information to be recorded on the DVD-R 1 in this embodiment is recorded for each synchronization frame. When the pre-information is recorded by use of the pre-pit 4, one pre-pit 4 to indicate the synchronization signal in the preinformation is always formed on the land track 3 adjacent to a region where the synchronization information SY in each synchronization frame of the record information is recorded. Moreover, one or two pre-pits 4 carrying the content of the pre-information to be recorded (address information and the like) are formed on the land track 3 adjacent to a front half portion within the synchronization frame other than the synchronization information SY. (In addition, there may be a case that the pre-pit 4 is not formed in the front half portion within the synchronization frame other than the synchronization information SY, depending on the content of the pre-information to be recorded).

At this time, in this embodiment, in one recording sector, the pre-pit 4 is formed only on an even-numbered synchronization frame (hereafter, referred to as an EVEN frame) or only on an oddnumbered synchronization frame (hereafter, referred to as an ODD frame), and then the pre-information is recorded. That is, in FIG. 2, if the pre-pit 4 is formed on the EVEN frame (indicated by the upward arrow on a solid line, in FIG. 2), the pre-pit 4 is not formed on the ODD frame before and after it.

On the other hand, in the groove track 2, the wobbling is performed on all the synchronization frames at a standard wobbling frequency f0 of 140 kHz (i.e., the frequency at which one synchronization frame corresponds to 8 waves). Then, a signal for the rotation control of a spindle motor and a signal for the record control of the record information are detected by a pre-format detector described later for detecting a wobbling frequency and a pre-pit signal from a rotating optical disc.

((Information Recording Apparatus))

Next, the information recording apparatus in a first embodiment of the present invention will be described below with reference to FIG. 3 to FIG. 5.

Figure 3:
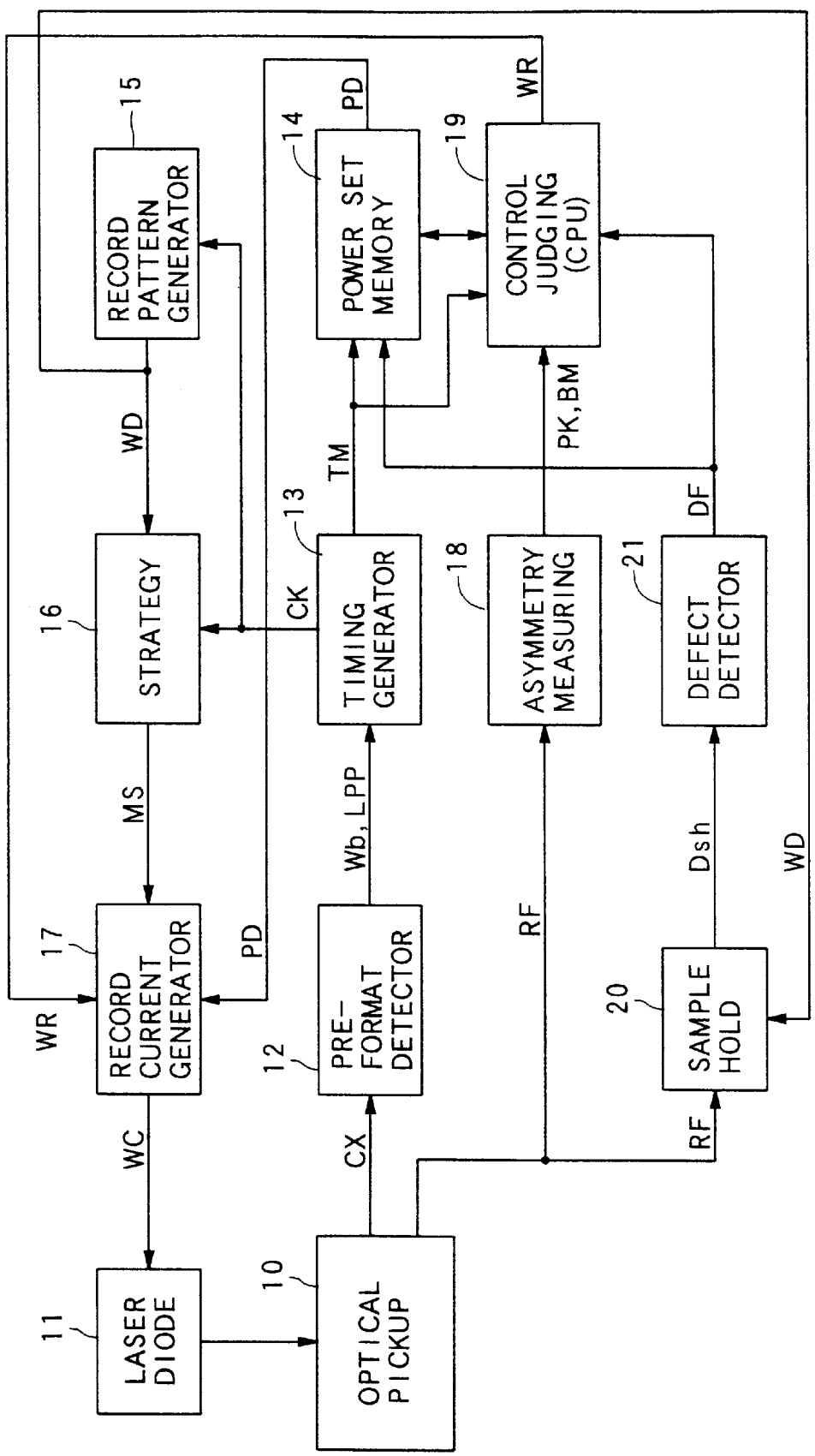
FIG. 3 is a block diagram showing a schematic configuration of an information recording apparatus as a first embodiment of the present invention.

As shown in FIG. 3, the information recording apparatus in this embodiment is provided with an optical pickup 10, a laser diode 11, a pre-format detector 12, a timing generator 13, a power set memory 14, a record pattern generator 15, a strategy circuit 16, a record current generator 17, an asymmetry measuring section 18, a control judging section 19, a sample hold circuit 20 and a defect detector 21.

The optical pickup 10 is a device which has a polarization beam splitter, an objective lens, a light detector and the like (which are not shown), and irradiates a light beam B outputted by the laser diode 11 onto an information record surface of the DVD-R 1, to thereby record digital information to be recorded. Also, the optical pickup 10 extracts a composite signal CX containing the information corresponding to a wobbling frequency of the pre-pit 4 and the groove track 2 based on the reflection light from the DVD-R 1 of the light beam B by using the radial push-pull method, and then outputs it to the pre-format detector 12. This composite signal CX is a superimposed signal of the wobble signal of the groove track 2 and a pre-pit signal based on the pre-pit 4 on the land track 3 adjacent to the groove track 2, as indicated by a signal (a) in FIG. 4. Also, the optical pickup 10 outputs a sum signal of the reflection lights from the information record surface of the light beam B to the asymmetry measuring section 18 and the defect detector 21 as a reproduction signal RF as indicated by a signal (e) in FIG. 4.

Figure 4:
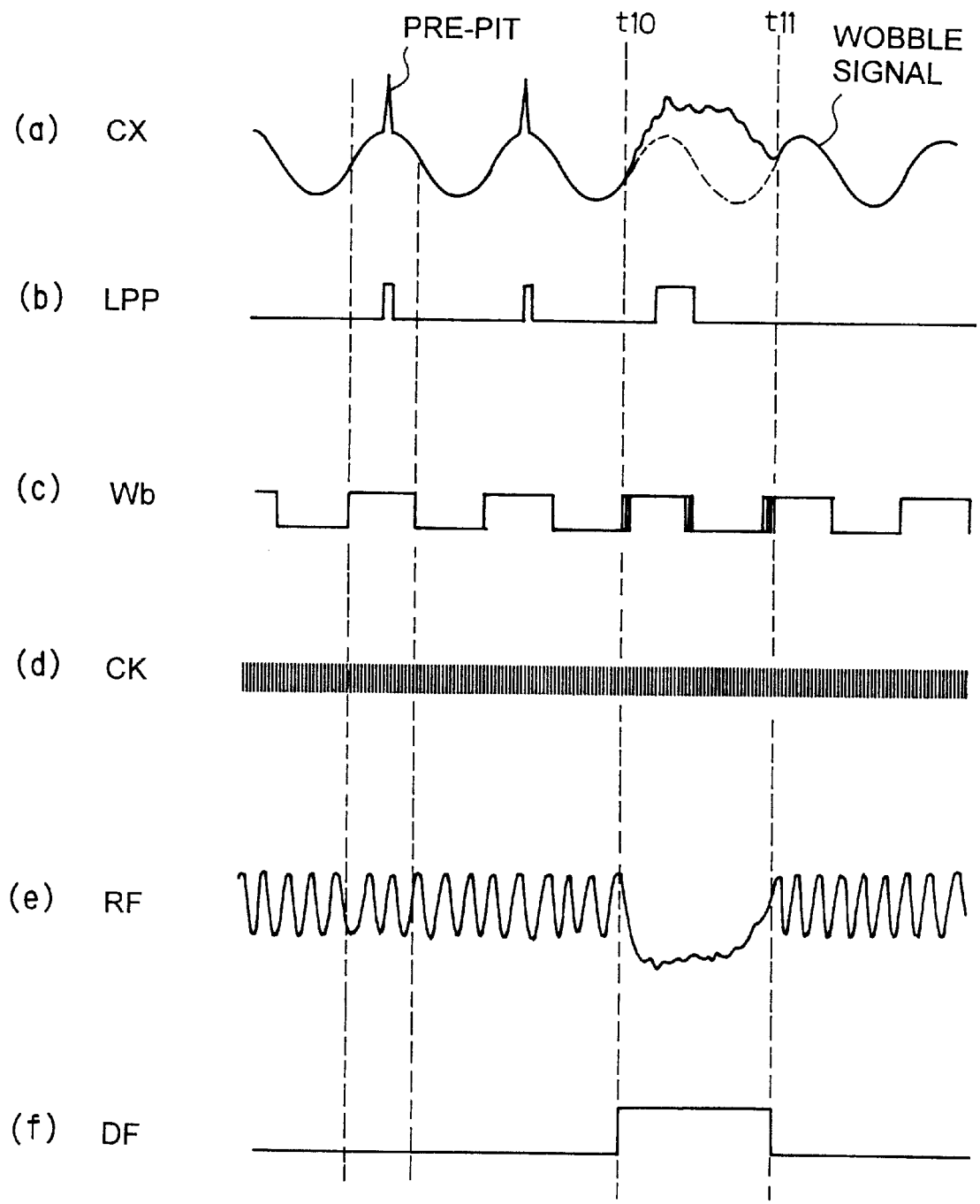
FIG. 4 is a timing chart showing operation wave forms at respective sections of the information recording apparatus of FIG. 3.

In FIG. 4, there are shown the composite signal CX (a) outputted by the optical pickup 10, the pre-pit detection signal LPP (b) outputted by the pre-format detector 12, an extracted wobble signal Wb (c) outputted by the pre-format detector 12, a clock signal CK (d) outputted by the timing generator 13, the reproduction signal RF (e) outputted by the optical pickup 10, and a defect detection signal DF (f) outputted by the defect detector 21.

The pre-format detector 12 is provided with: a wobbling detector (not shown) including a band pass filter with the standard wobbling frequency fO as a central frequency and the like; and a comparator (not shown) for converting the wobble signal detected by the wobbling detector into a binary value. The pre-format detector 12 outputs an extracted wobble signal Wb as shown in FIG. 4(*c*), in accordance with the composite signal CX outputted by the optical pickup 10. Also, the pre-format detector 12 is provided with a pre-pit signal detector (not shown), and detects a pre-pit signal in accordance with the composite signal CX outputted by the optical pickup 10, and further outputs the detected pre-pit signal as a pre-pit detection signal LPP as shown in FIG. 4 (*b*).

Figure 5:
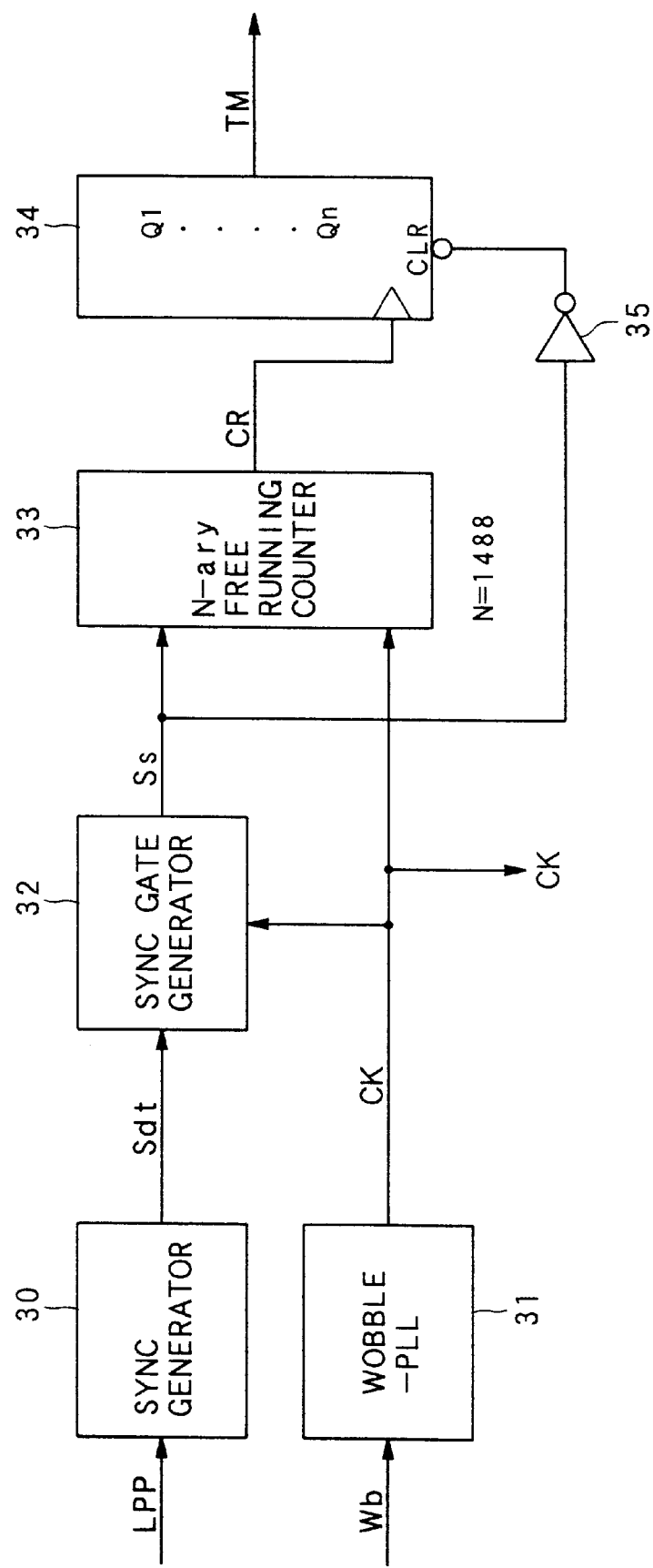
FIG. 5 is a block diagram showing a detailed configuration of a timing generator in the information recording apparatus of FIG. 3.

As shown in FIG. 5, the timing generator 13 is provided with: a synchronization detector 30; a wobble PLL (Phase Locked Loop) circuit 31; a synchronization gate generator 30; an N-ary free running counter (FRC) 33; a counter 34; and an inverter gate 35. The timing generator 13 generates a clock signal CK and location timing data TM, in accordance with the extraction wobble signal Wb and the pre-pit detection signal LPP outputted by the pre-format detector 12, and then outputs the clock signal CK to the strategy circuit 16 and the record pattern generator 15, and also outputs the location timing data TM to the power set memory 14 and the control judging section 19.

The synchronization detector 30 shown in FIG. 5 has a flip-flop circuit (not shown) and the like, and then uses a fact that three pre-pits 4 for generating a synchronization signal corresponding to a lead synchronization frame of one recording sector are continuously formed at a location of a maximum amplitude in the wobbling of the groove track 2, and thereby detects the pre-pit 4 indicative of the lead of the one recording sector, and further generates a detection synchronization signal Sdt. In short, when the pre-format detector 12 outputs the pre-pit detection signal LPP as indicated by a signal (a) in FIG. 6 to the synchronization detector 30, the synchronization detector 30, if continuously detecting three pre-pit detection signals LPP rising from a Low level to a High level, generates a detection synchronization signal Sdt rising from the Low level to the High level as indicated by a signal (b) in FIG. 6, and then outputs it to the synchronization gate generator 32.

Figure 6:
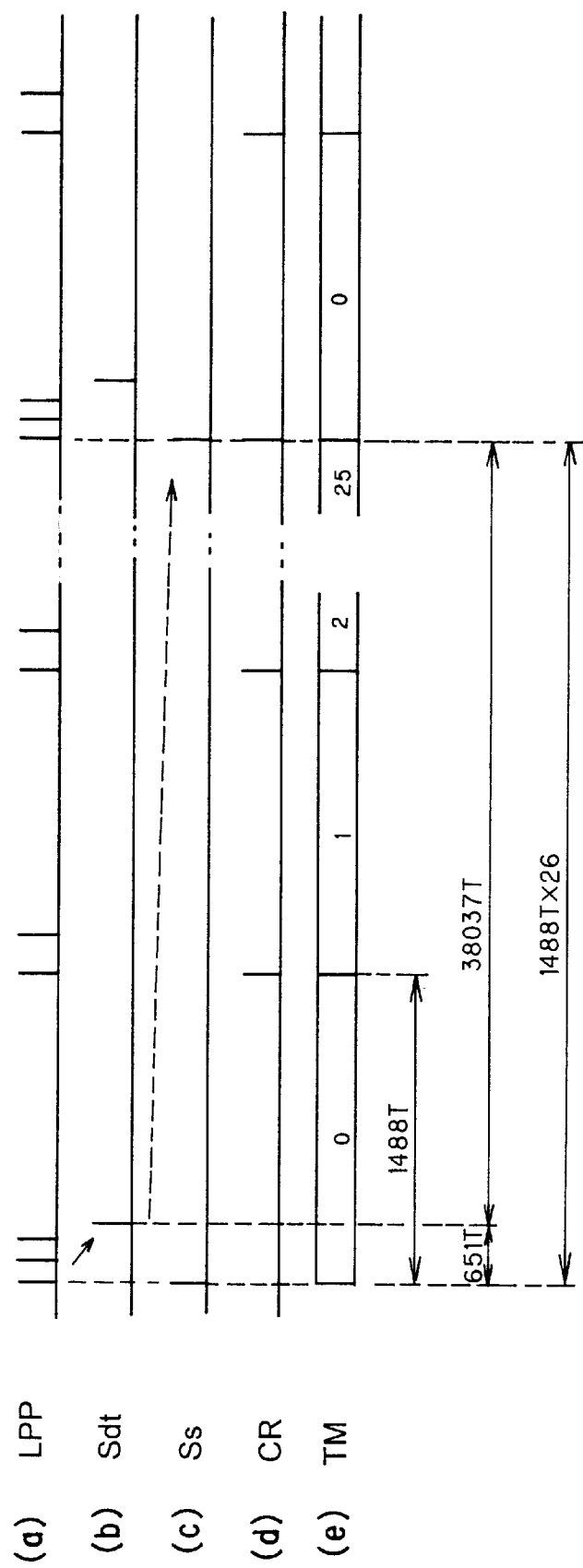
FIG. 6 is a timing chart showing output timings of signals at respective portions in the timing generator of FIG. 5.

In FIG. 6, there are shown the pre-pit detection signal LPP (a) sent to the synchronization detector, the detection synchronization signal Sdt (b) outputted by the synchronization detector, a sector synchronization signal Ss (c) outputted by the synchronization gate generator, a carry signal CR (d) outputted by the N-ary free running counter, and the location timing data TM (e) outputted by the counter;

The synchronization generator 32 is provided with a flip-flop circuit, a counter and the like (which are not shown), and then starts an operation of counting the clock signal CK outputted by the wobble PLL circuit 31 at a timing when the detection synchronization signal Sdt drops from the High level to the Low level, and further outputs a sector synchronization signal Ss that rises from the Low level to the High level as shown in FIG. 6(c) when the count value reaches 38037T. This value of 38037T is a value in which 651T equal to 3.5 times of the cycle (186T) of the extraction wobble signal Sb is subtracted from the cycle (1488T×26) of one recording sector. Three pre-pits 4 are continuously formed in the lead synchronization frame of the one recording sector. The period until the detection synchronization signal Sdt is outputted by the synchronization detector 30 after the pre-pit signal LPP is outputted correspondingly to the lead pre-pit 4 among those three pre-pits 4 is set so as to be 651T equal to 3.5 times of the cycle (186T) of the extraction wobble signal Wb. Thus, the synchronization gate detector 32 counts 38037T that is the period in which this 651T is subtracted from the cycle of (1488T×26) corresponding to the one recording sector, and accordingly estimates a timing of the lead of the one recording sector, and then outputs the sector synchronization signal Ss at this timing.

The N-ary free running counter 33 starts the operation of counting the clock signal CK (the cycle T) outputted by the wobble PLL circuit 31, after the sector synchronization signal Ss is inputted. After that, it is cleared each time the count value reaches 1488T, and the counting operation is repeated. Then, when the count value reaches 1488T, a carry signal CR is outputted which rises from the Low level to the High level, as shown in FIG. 6(d). In short, the output timing of this carry signal CR indicates the timing of the lead of each synchronization frame.

The counter 34 is a binary counter of n bits. It carries out the counting operation each time the carry signal CR drops from the High level to the Low level. Then, the count value is cleared at a timing when the sector synchronization signal Ss outputted through the inverter 35 rises from the Low level to the High level. Thus, in this embodiment, each time the carry signal CR drops from the High level to the Low level, the counter 34 outputs the location timing data TM of 5 bits for indicating 0 to 25, as shown in FIG. 6(e). The carry signal CR is outputted at the timing of the lead of each synchronization frame, as mentioned above. Hence, this location timing data TM represents the number as the location information of each synchronization frame.

The wobble PLL circuit 31 is provided with a phase comparator, a low pass filter, a VCO (Voltage Controlled Oscillator) and a divider which are not shown, and then outputs a clock signal CK with a cycle T. The phase comparator compares a phase of the extraction wobble signal Wb with a phase of a signal in which the extraction wobble signal Wb is divided as an input, and then outputs an error signal corresponding to the phase difference between these compared signals. The low pass filter passes a low frequency component in this error signal. The VCO changes an oscillation frequency on the basis of the output from this low pass filter, and then outputs the clock signal CK. The divider divides the oscillation output clock signal CK, and then generates a signal of a frequency equal to that of the extraction wobble signal Wb, and further outputs it to the other input of the phase comparator. Thus, the clock signal CK outputted by such a wobble PLL circuit 31 is a signal whose phase is synchronous with that of the extraction wobble signal Wb. Also, the cycle of the clock signal CK is set to T (T corresponds to a bit (a channel bit) interval in data system after the 8–16 modulation). This clock signal CK is sent not only to the respective circuits in this timing generator 13 but also to the record pattern generator 15 and the strategy circuit 16, as shown in FIG. 3, and serves as a standard clock signal at the time of recording. As mentioned above, in this embodiment, the location information generator is provided with the synchronization detector 30, the wobble PLL circuit 31, the synchronization gate detector 32, the N-ary free running counter 33 and the counter 34.

Figure 7:
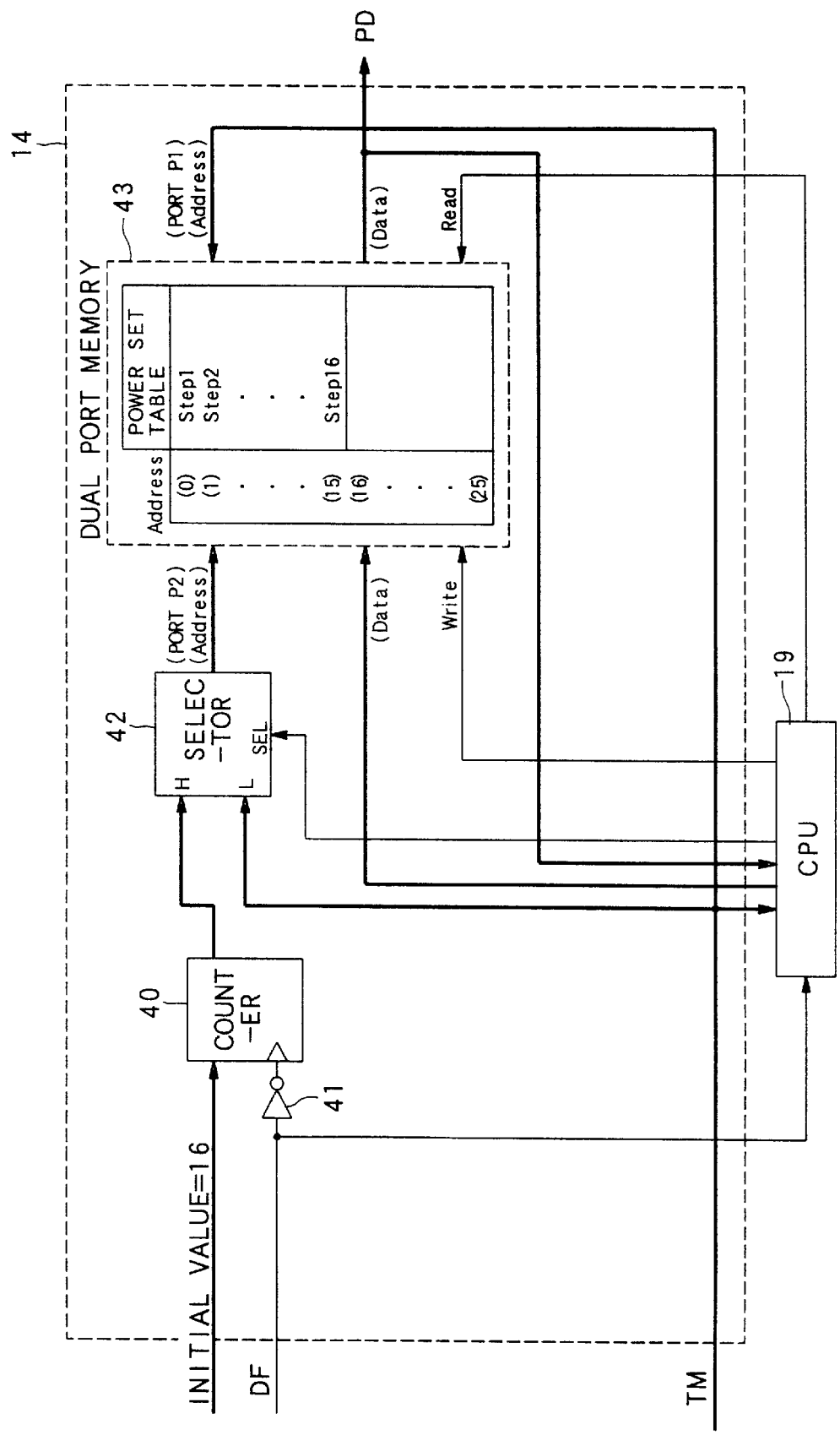
FIG. 7 is a block diagram showing a detailed configuration of a power set memory in the information recording apparatus of FIG. 3.

Again returning back to FIG. 3, the power set memory 14 is described. The power set memory 14 is provided with a counter 40, an inverter gate 41, a selector 42 and a dual port memory 43, as shown in FIG. 7. A set value of a record power for each unit test signal record region in a test signal record region on the DVD-R 1 described later is outputted in accordance with the location timing data TM. Also, the control judging section 19 is connected to the power set memory 14. Then, when a defect is detected, the set value of the record power is stored into a save region of the dual port memory 43, in accordance with the control of the control judging section 19.

The dual port memory 43 serving as one example of a storing device is provided with two ports i.e., a port P1 and a port P2. Data can be read out and written in independently in the respective ports. In this embodiment, the data is read out through the port P1, and the data is written in through the port P2. This embodiment has the configuration that the above-mentioned location timing data TM is sent to an address terminal of the port P1. While a read signal is outputted from the control judging section 19 to a read terminal of the port P1, the power set value stored in the address represented by the location timing data TM is outputted as power set data PD from the data terminal of the port P1. Also, this power set data PD is read by the control judging section 19. Moreover, this embodiment has the configuration that an output terminal of a selector 42 is connected to an address terminal of the port P2, and a select signal is sent from the control judging section 19 to the selector terminal of the selector 42. If the select signal is at the High level, an H input terminal of the selector 42 becomes effective, and the location timing data TM is sent to the address terminal of the port P2. Also, the data is outputted from the control judging section 19 to the data terminal of the port P2. Thus, the power set values Step 1 to Step 16 are outputted from the control judging section 19, and the location timing data TM outputted by the timing generator 13 is updated. At this timing, the write signal is outputted from the control judging section 19 to the write terminal of the port P2. Accordingly, the power set values Step 1 to Step 16 are written to the memory region of the address value represented by the location timing data TM, in the dual port memory 43. In addition, the dual port memory 43 has memory regions specified by the address values 0 to 25. So, the memory regions of the address values 0 to 15 are the regions to which normal power set values are written, and the memory regions of the address values 16 to 25 are the save regions when the defect is detected. Such power set values Step 1 to Step 16 written into the memory regions of the dual port memory 43 are values when the record power of the laser diode 11 is divided into 16 steps or stages, and are stored in advance in a memory (not shown) of the control judging section 19. Also, if the select signal is at the Low level, the L input terminal of the selector 42 becomes effective, and the output from the counter 40 is sent to the address terminal of the port P2. The counter 40 increases the count value by 1, at a timing when the defect detection signal DF outputted by the defect detector 21 drops from the High level to the Low level. In this embodiment, an initial value of the counter 40 is set to "16". Although the output from the counter 40 is sent to the address terminal of the port P2 when the select signal becomes at the Low level, the control judging section 19 switches the select signal from the High level to the Low level, at the timing when the defect detection signal DF rises from the Low level to the High level. Under the above-mentioned configuration, if the location timing data TM 0 to 25 are outputted as indicated by data (a) in FIG. 8, the location timing data TM are sent to the address terminal of the port P1, as indicated by an address signal (b) in FIG. 8.

Figure 8:
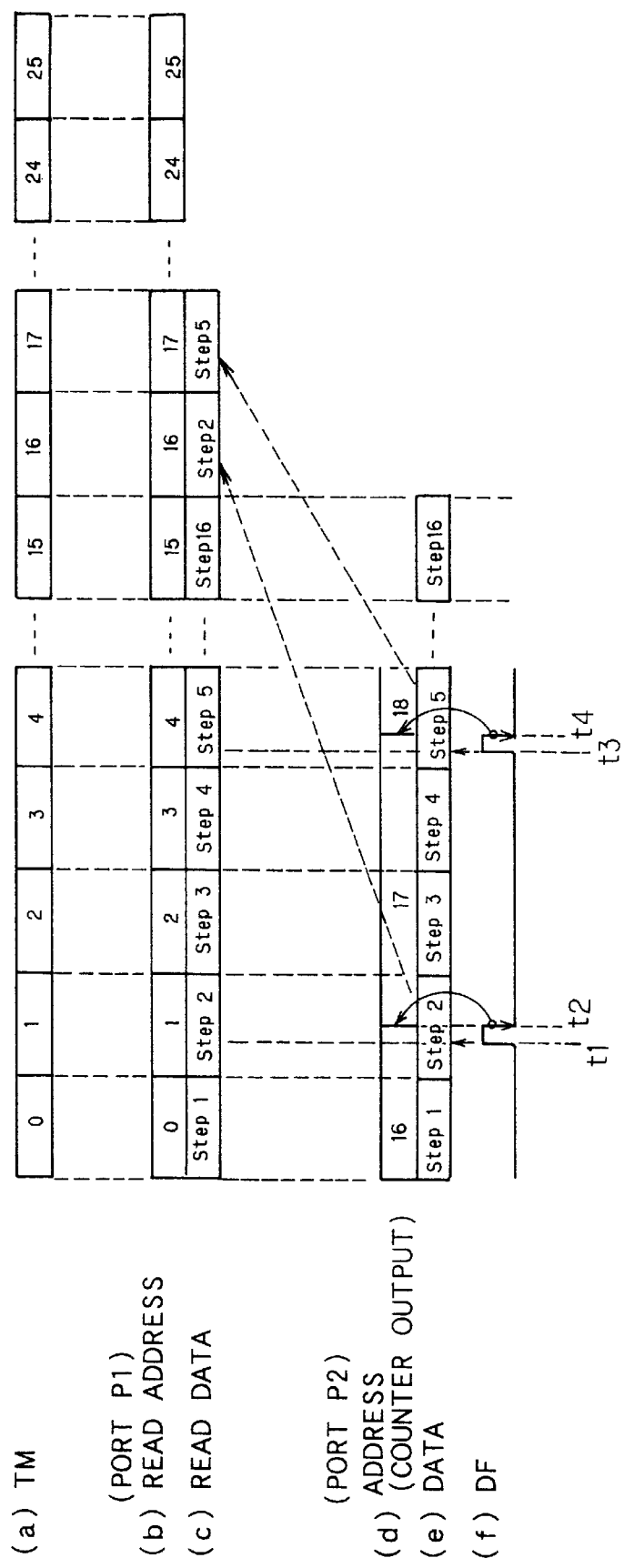
FIG. 8 is a timing chart showing the operation of the power set memory of FIG. 7.

In FIG. 8, there are shown the output value of the location timing data TM (a) outputted by the timing generator, the output value of the address signal (b) inputted to the port 1 of the dual port memory, an output value of a data signal (c) inputted to the port 1, an output value of an address signal (d) inputted to the port 2, an output value of a data signal (e) inputted to the port 2, and an output value of the defect detection signal DF (f) outputted by the defect detector.

Then, the power set values Step 1 to Step 16 stored in the memory regions of the address values represented by the respective location timing data TM are read out from the data terminal of the port P1, and are outputted as the power set data PD. Here, if the defect detection data DF rises from the Low level to the High level at a time t1 as shown in FIG. 8(f), the control judging section 19 switches the select signal to the Low level, and makes the L input terminal of the selector 42 effective. Accordingly, the output from the counter 40 is sent to the address terminal of the port P2. At the time t1, the value of the output from the counter 40 is "16" that is the initial value, as shown in FIG. 8(d). Then, this value "16" is sent to the address terminal of the port P2. Also, at the time t1, the power set value read out from the data terminal of the port P1 is the value Step 2 as shown in FIG. 8(c). Hence, since the control judging section 19 outputs the write signal to the write terminal of the port P2 at a timing of a time t2 when the defect detection data DF drops from the High level to the Low level at the time t2, the value Step 2 is written into the region of the address value 16. Also, the count value of the counter 40 is increased by 1, at the timing of the time t2 when this defect detection data DF drops from the High level to the Low level, and becomes "17" as shown in FIG. 8(d). Also, similarly, as shown in FIG. 8(f), at a timing of a time t3 when the defect detection signal DF rises from the Low level to the High level, Step 5 that is the data read out at that time is written into the region of the address value 17. Thus, the count value of the counter 40 becomes "18". The data of the address value 16 and the address value 17 newly written as mentioned above are read out when the values of the location timing data TM become 16 and 17 as shown in FIGS. 8(b) and (c), and are outputted as the power set data PD. As mentioned above, in this embodiment, if the defect detection signal DF is not outputted, the power set values Step 1 to Step 16 are respectively outputted one at a time, as the power set data PD. However, the power set value to be read out if the defect detection signal DF is outputted is outputted later again as the power set data PD.

Figure 9:
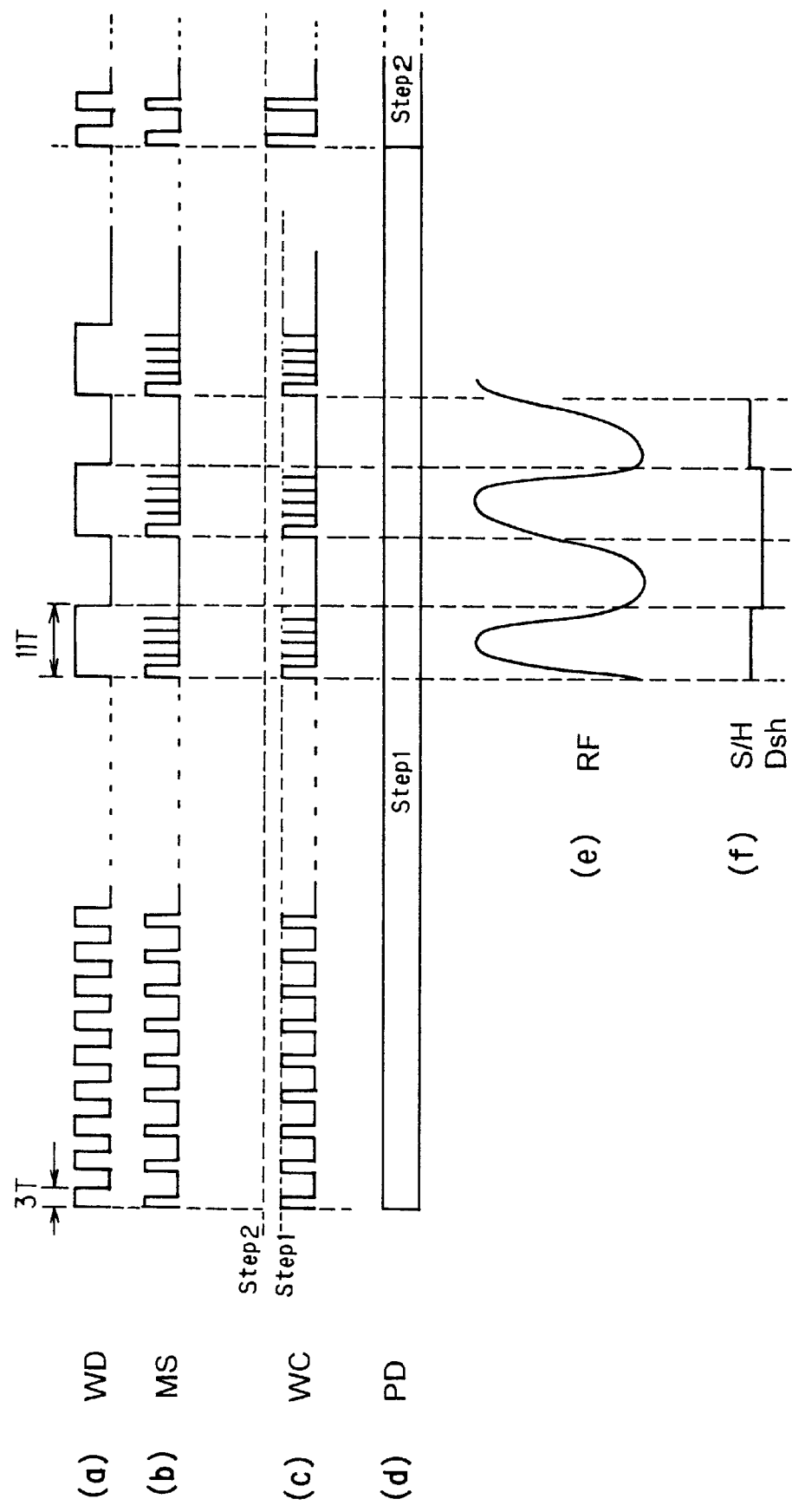
FIG. 9 is a timing chart showing the operations of a record pattern generator, a strategy circuit, a record current generator and the like in the information recording apparatus of FIG. 3.

The record pattern generator 15 is a circuit for generating record data WD as indicated by data (a) in FIG. 9. In this embodiment, it generates data of 3T corresponding to the shortest pit and data of 11T corresponding to the longest pit within a period (i.e., a cycle) corresponding to one synchronization frame, as test record data. The above-mentioned clock signal CK is sent to the record pattern generator 15 from the timing generator 13. These record data are generated synchronously with this clock signal CK.

In FIG. 9, there are shown the record data WD (a) outputted by the record pattern generator 15, a laser modulation signal MS (b) outputted by the strategy circuit 16, a record current WC (c) outputted by the record current generator 17, a power set data PD (d) inputted to the record current generator 17, the reproduction signal RF (e) outputted by the optical pickup 10, and an output signal Dsh (f) of the sample hold circuit 20.

The strategy circuit 16 is a circuit for converting the record data outputted by the record pattern generator 15, into a laser modulation signal MS shown in FIG. 9(b). Then, it performs a pulse length control, a multiple pulse division and the like on the record data to thereby generate the laser modulation signal MS. The main purposes of such a conversion are to protect the thermal interference and the thermal accumulation between pits adjacent to each other and to reduce a jitter component contained in the reproduction signal.

The record current generator 17 serving as one example of a recording device is a circuit for modulating an amplitude of the laser modulation signal MS outputted by the strategy circuit 16, on the basis of the power set data PD outputted by the power set memory 14. Thus, if the power set data PD indicates the value Step 1 as shown in FIG. 9(d), the record current WC outputted by the record current generator 17 has a current value corresponding to the value Step 1 as shown in FIG. 9(c). If the power set data PD indicates the value Step 2 as shown in FIG. 9(d), the record current WC outputted by the record current generator 17 has a current value corresponding to the value Step 2 as shown in FIG. 9(c). Accordingly, the power level of the laser diode 11 becomes a record power level corresponding to the power set data PD in a period while the laser modulation signal MS is at the High level, and becomes a constant low level (i.e., the reproduction power level) in a period while the laser modulation signal MS is at the Low level.

Figure 10:
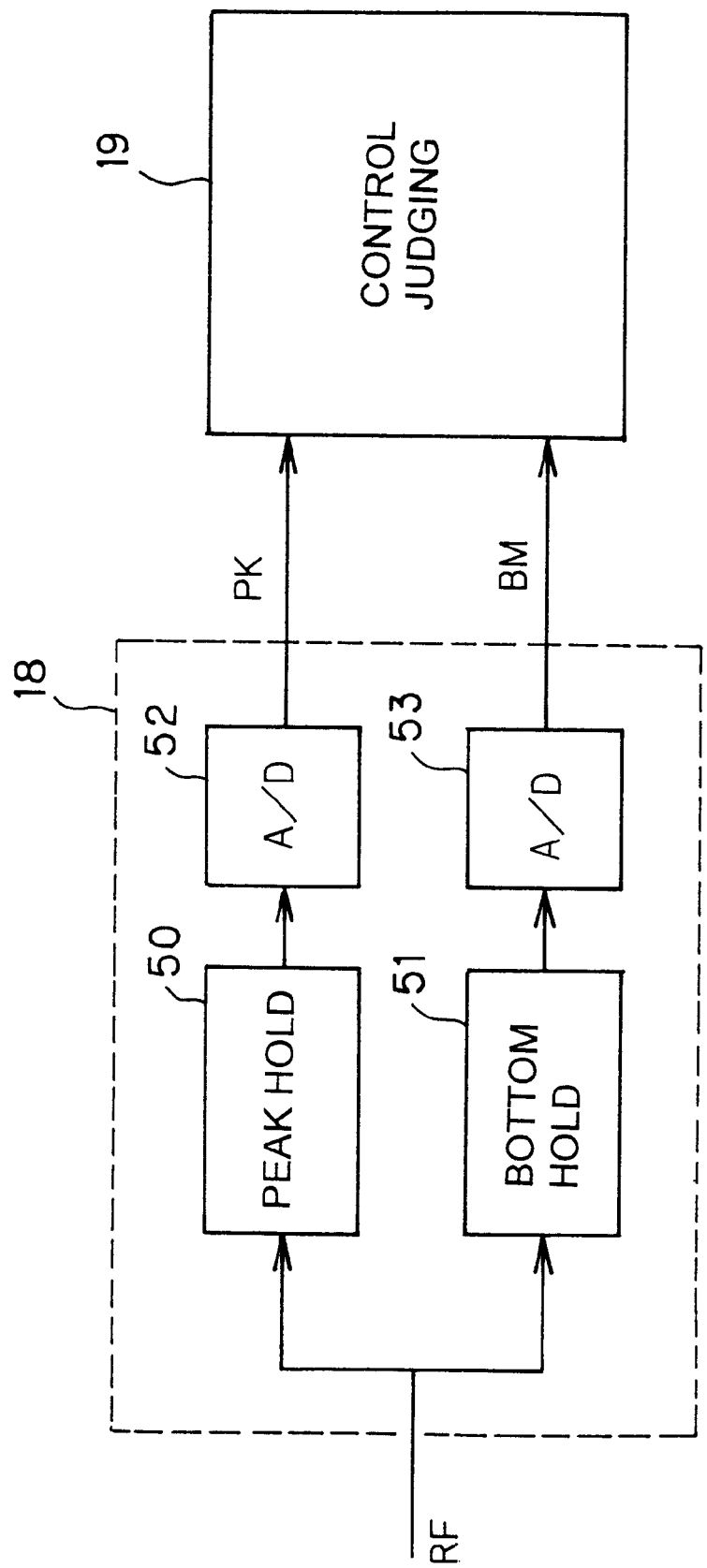
FIG. 10 is a block diagram showing a detailed configuration of an asymmetry measuring section in the information recording apparatus of FIG. 3.

The asymmetry measuring section 18 is a circuit for measuring a peak value and a bottom value for each unit test record region, with regard to the reproduction signal of the record data written to a test record region of the DVD-R 1 by the above-mentioned respective circuits, and then converting it into digital data, and further outputting it to the control judging section 19. The asymmetry measuring section 18 is provided with a peak holding circuit 50, a bottom holding circuit 51 and A/D (analog to digital) conversion circuits 52 and 53, as shown in FIG. 10. Then, the peak value of the reproduction signal RF is measured by the peak holding circuit 50, the bottom value of the reproduction signal RF is measured by the bottom holding circuit 51, and they are converted into digital data PK and BM by the A/D conversion circuits 52 and 53, respectively. If the test signals which have the cycle of 3T and 11T as mentioned above and are amplitude-modulated on the basis of current values corresponding to the power set values Step 1 to Step 16 are recorded on the unit test record region (whose region numbers are from 0 to 25) corresponding to one synchronization frame and are then reproduced, the reproduction signal RF is outputted as shown in FIG. 11.

Figure 12:
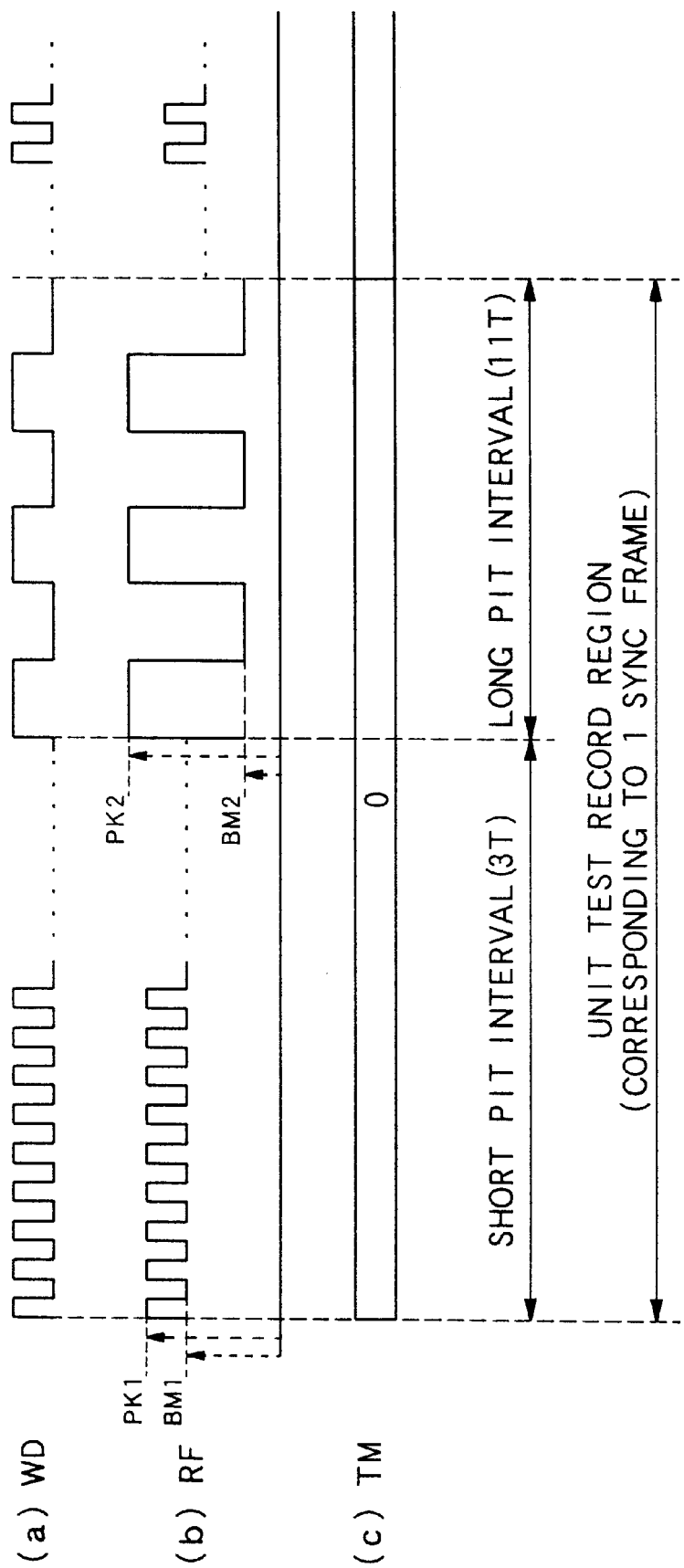
FIG. 12 is a timing chart showing wave forms of various signals in one unit test record region of FIG. 11.

In FIG. 12, there are shown the record data WD (a) serving as the basis of a reproduction signal, the reproduction signal RF (b), and location timing data TM (c) corresponding to the unit test record region.

Figure 11:
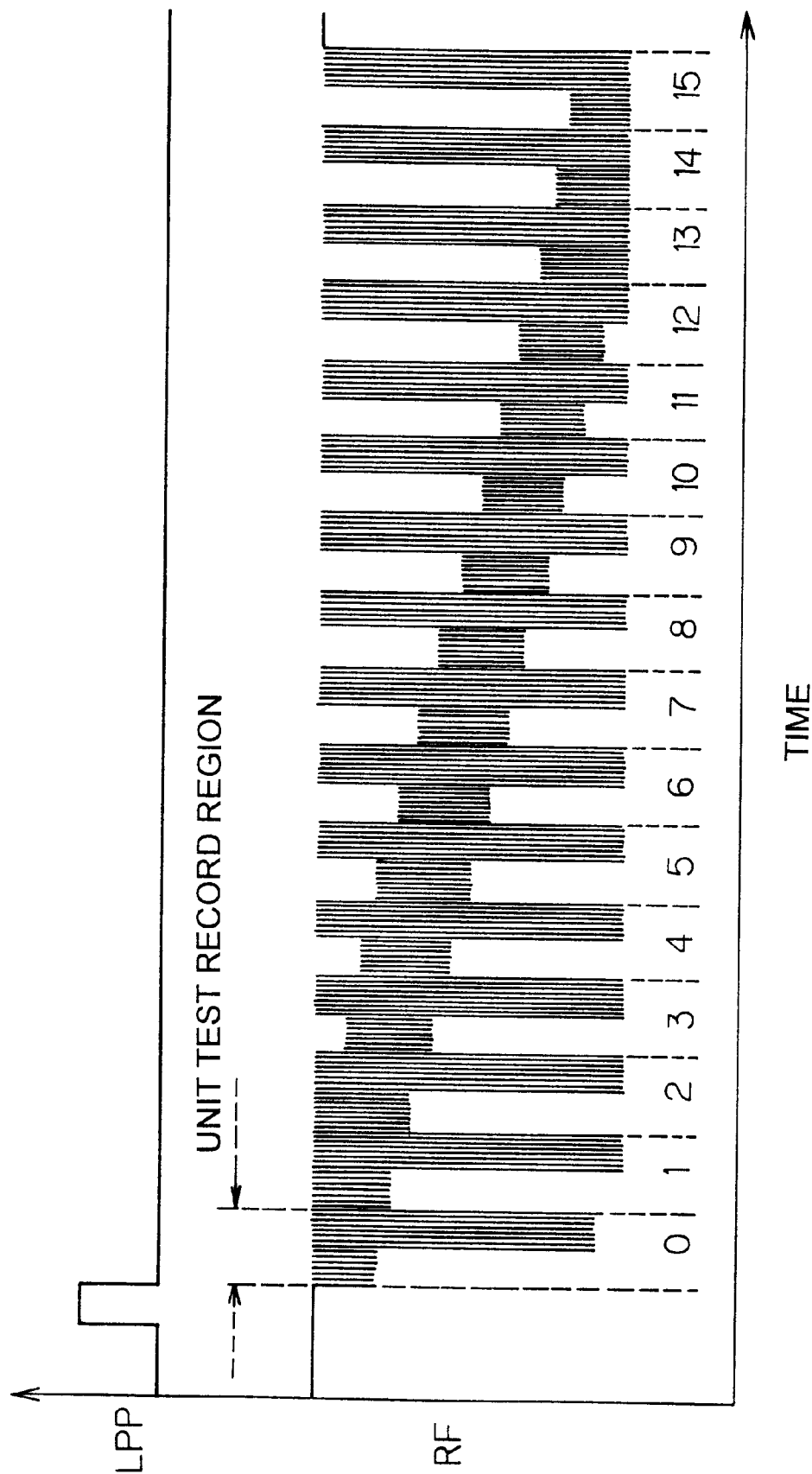
FIG. 11 is a diagram showing a reproduction signal for each unit test record region inputted to the asymmetry measuring section of FIG. 10.
Figure 13:
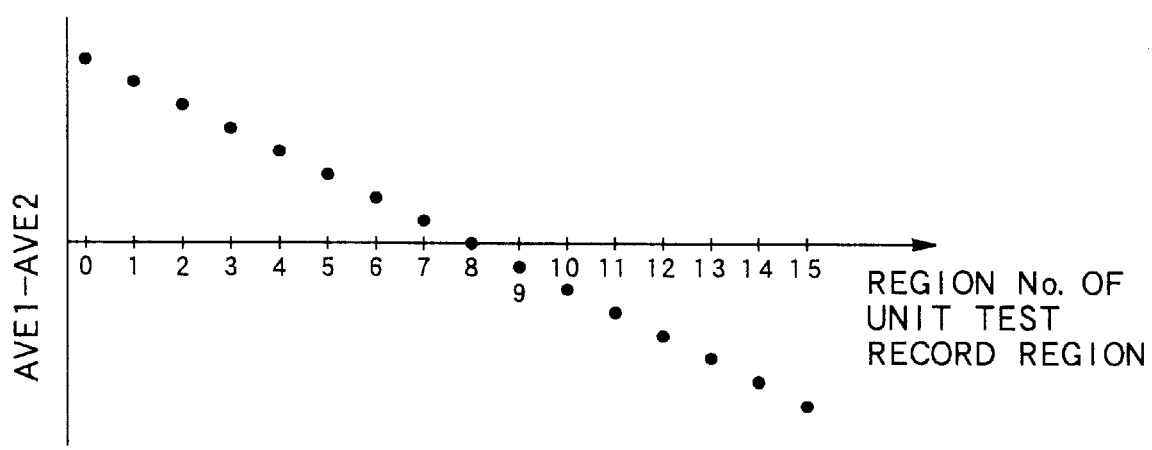
FIG. 13 is a graph of plotting the asymmetry, which is calculated in accordance with an output result from the asymmetry measuring section of FIG. 10, for each unit test record region.

FIG. 12(b) shows the enlarged reproduction signal RF in one unit test record region shown in FIG. 11. As shown in FIG. 12(b), the respective reproduction signals RF in a short pit block and a long pit block are generated for each unit test record region. Those reproduction signals RF have the different values for each unit test record region, as can be understood from FIG. 11. This reason is as follows. As mentioned above, each time the location timing data TM (from 0 to 25) are changed, the different power set values Step 1 to Step 16 are outputted as the power set data PD, and the amplitude of the record data WD is modulated in accordance with this power set data PD to thereby record the test signal. Thus, in each of the unit test record regions, the reproduction states of the respective reproduction signals RF in the short pit block and the long pit block are determined under a predetermined condition to thereby select a unit test record region reproduced in an optimal state for both the blocks. Moreover, the power set value of the power set data PD used in recording on the unit test record region is read out from the dual port memory 43 to thereby select the power set value of the record power optimal for the combination of the information recording apparatus and the DVD-R 1. In this embodiment, a peak value PK1 and a bottom value BM1 in the short pit block and a peak value PK2 and a bottom value BM2 in the long pit block are outputted from the asymmetry measuring section 18 to the control judging section 19. Then, the control judging section 19 calculates an average value AVE1 of the peak value PK1 and the bottom value BM1 in the short pit block and an average value AVE2 of the peak value PK2 and the bottom value BM2 in the long pit block, and then calculates a difference (i.e., the asymmetry value) between the average value AVE1 in the short pit block and the average value AVE2 in the long pit block, and further selects as an optimal power set value a power set value used in recording on the unit test record region in which the difference (i.e., the asymmetry value) is 0. FIG. 13 is a view of plotting such a difference (i.e., the asymmetry value) between the average value AVE1 in the short pit block and the average value AVE2 in the long pit block, for each unit test record region. In this embodiment, a record power used in recording on a reproduction signal in which such a difference (i.e., the asymmetry value) is 0 is selected as the optimal record power. Hence, in a case of FIG. 13, the power set value Step 9 used in recording on the unit test record region of the region number 8 is defined as the optimal power set value. However, the present invention is not limited to such a configuration. So, the optimal power may be selected by measuring in advance a relation between the difference (i.e., the asymmetry value) and the jitter component contained in the reproduction signal and then reducing the jitter component as much as possible.

The control judging section 19 serving as one example of a record controlling device and a power set value storing device calculates the asymmetry value in accordance with the measured value outputted by the asymmetry measuring section 18, as mentioned above, and also selects the optimal value of the power set value. The control judging section 19 controls the power set memory 14 so that the power set data is outputted on the basis of the output timing of the location timing data TM. Also, when a defect is detected, the control judging section 19 stores a power set value for the location timing data TM at that time, into the dual port memory, as a power set value for another location timing data TM. Moreover, the control judging section 19 outputs the write data WR to the record current generator 17 so that a recording operation is executed.

The sample holding (S/H) circuit 20 is a circuit for sampling the reproduction signal RF in a period while the record data WD is at the Low level, as shown in FIG. 9(e) and (f), and also holding the sampled value in a period while the record data WD is at the High level. In this way, the reproduction signal RF is sampled only while the output power of the laser diode 11 is at a reproduction level. In this way, in this embodiment, the reproduction signal RF that is located at a space portion and is not located at a mark portion at which the pit is generated is used as the reproduction signal RF for detecting the defect. Even if the defect is present in the space portion, a drop of a reflectance causes the level of the reproduction signal RF to be reduced, which enables the defect to be detected.

Figure 14:
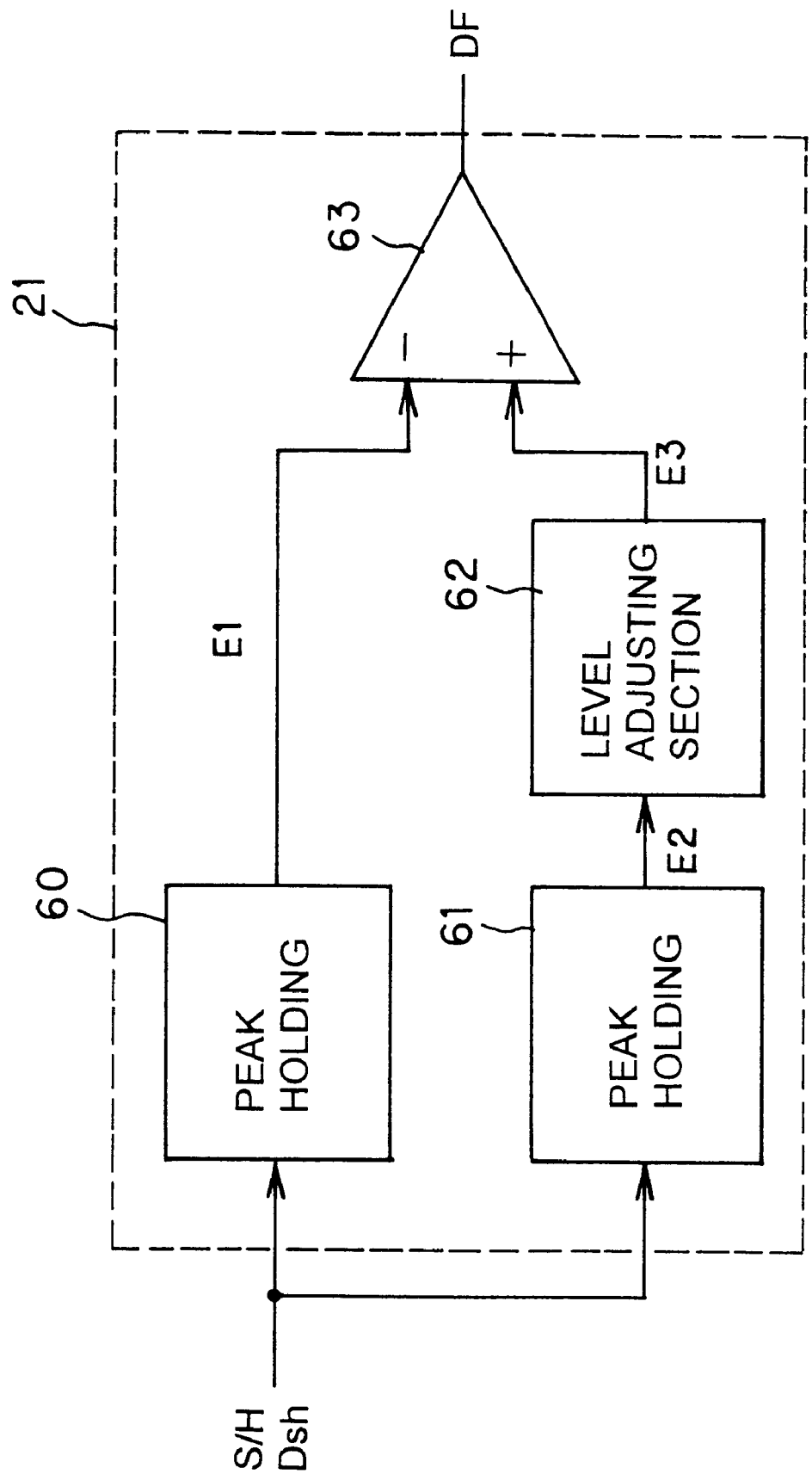
FIG. 14 is a block diagram showing a detailed configuration of the defect detector in the information recording apparatus of FIG. 3.

The defect detector 21 is a circuit for detecting the defect in accordance with an output signal Dsh from the sample hold circuit 20. In detail, as shown in FIG. 14, the defect detector 21 is provided with a peak holding circuit 60, a peak holding circuit 61 having a time constant longer than that of the peak holding circuit 60, a level adjusting section 62 for adjusting an amplitude level of an output signal of the peak holding circuit 61, and a comparator 63 for comparing a level of an output signal of the peak holding circuit 61 with a level of an output signal from the level adjusting section 62.

The peak holding circuit 60 holds a peak level of the output signal Dsh from the sample hold circuit 20 only for a period corresponding to the set time constant. Such a time constant is determined on the basis of the smallest defect of the defects needing the compensation according to the present invention. For example, it is set to about several micro-seconds. Since it is set to this time constant, an envelope signal E1 of the output signal Dsh, in which an amplitude level is dropped closely following the occurrence of the defect, is outputted from the peak holding circuit 60 to an inversion input terminal of the comparator 63.

On the other hand, the peak holding circuit 61 has a time constant which is sufficiently larger than the time constant set by the peak holding circuit 61 and can be sufficiently detected by a detecting method described later. For example, it is set to about several milli-seconds. Since it is set to this time constant, an envelope signal E2 of the output signal Dsh, in which a drop of the amplitude level follows the occurrence of the defect with a sufficient delay, is sent from the peak holding circuit 61 to the level adjusting section 62.

The level adjusting section 62, after carrying out an adjustment so that the amplitude level of the envelope signal E2 outputted by the peak holding circuit 61 is slightly lower than that of the envelope signal E1 outputted by the peak holding circuit 60 in a condition that the defect is not induced, outputs an envelope signal E3, on which such an adjustment is performed, to a non-inversion input terminal of the comparator 63.

Then, the comparator 63 compares the respective sent envelope signals E1 and E3 with each other. If the defect is not induced, both the peak holding circuits 60 and 61 continue to hold the peak levels of the output signal Dsh. However, the amplitude level of the envelope signal E2 outputted by the peak holding circuit 61 is set to be slightly lower than that of the envelope signal E1 by the level adjusting section 62. Thus, the signal of the Low level is outputted by the comparator 63.

On the other hand, if the defect is induced, since the time constant of the peak holding circuit 60 is short as mentioned above, the amplitude level of the envelope signal E1 is dropped immediately following the occurrence of the defect. However, even if the defect is induced, the amplitude level of the envelope signal E3 is not dropped immediately following the occurrence of the defect, due to the sufficiently long time constant of the peak holding circuit 61. Thus, the defect detection signal DF of the High level corresponding to a period (from a time t10 to a time t11) while the defect is induced, is outputted by the comparator 63, as shown in FIG. 4(f).

Such a defect detection signal DF is outputted to the control judging section 19 and the power set memory 14, as mentioned above. Then, a process of re-writing a power set value is carried out.

((Laser Power Calibration Process))

Next, a laser power calibration process carried out by the information recording apparatus of this embodiment as mentioned above will be described below with reference to flowcharts in FIGS. 15A and 15B and a timing chart in FIG. 16.

In FIG. 16, there are shown the location timing data TM (a) sent to the dual port memory 43, an address signal (b) inputted to the port 2 of the dual port memory 43, a data signal (c) inputted to the port 2, an address signal (d) inputted to the port 1, a data signal (e) inputted to the port 1, a selector signal SEL (f) inputted to the selector 42, a write signal (g) inputted to the port 1, a read out signal (h) inputted to the port 1, a defect detection signal DF (i) inputted to the control judging section 19, and an output value of the counter 40 (j) serving as one example of an address signal inputted to the port 2.

In the DVD-R 1 of this embodiment, a usual operation of recording and reproducing the information is carried out in a program area, and the laser power calibration process in this embodiment is carried out in a test record region existing within a lead in area. Also, the test record region in this embodiment has a size corresponding to one recording sector, namely, 26 synchronization frames, and each is constituted by a unit test record region having a size corresponding to one synchronization frame. Unit test record regions from an region number 0 to an region number 15 are regions in which a test record of a test signal is carried out irrespectively of the presence or absence of the detection of the defect. Also, unit test record regions from an region number 16 to an region number 25 are the save regions. So, only if the defect is detected, the record data of the same power set value as the record data to be recorded on the unit test record regions from the region number 0 to the region number 15 in which the defect is detected are recorded in those save regions.

Also, the laser power calibration process is mainly carried out under the control of the control judging section 19, at an initial setting when a power supply of the information recording apparatus is turned on, or at a time when a record button (not shown) or the like is pushed down. The flowcharts in FIGS. 15A and 15B show the flow of the control carried out by the control judging section 19.

Figure 15A:
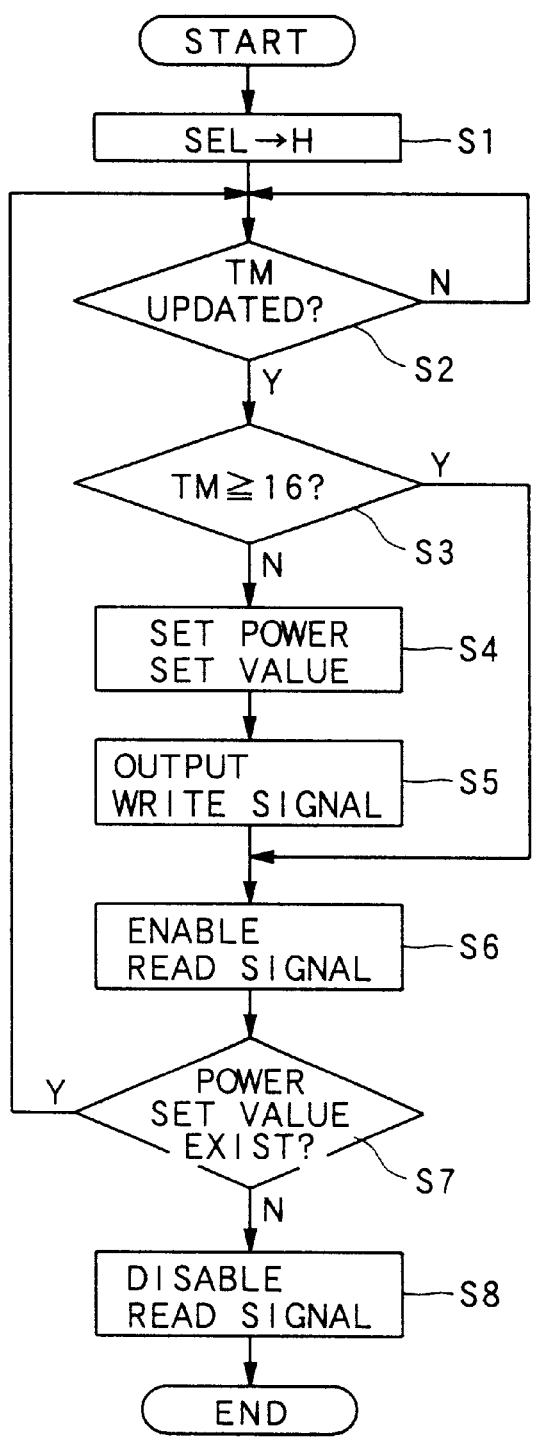
FIG. 15A is a flowchart showing a main routine in a process of outputting the power set data in the power calibration process in the first embodiment of the present invention.

At first, when the laser power calibration process is started, the signal of the High level is sent from the control judging section 19 to the selector terminal of the selector 42 of the power set memory 14 (refer to FIG. 7) as shown in FIG. 15A (step S1). Accordingly, the location timing data TM outputted by the timing generator 13 is sent to the address terminal of the port 2 of the dual port memory 43. Next, it is determined whether or not the location timing data TM is updated (step S2). The counter 34 (refer to FIG. 5) of the timing generator 13 is cleared at the lead timing of the one recording sector from the synchronization gate generator 32 (refer to FIG. 5), namely, at a leading edge to the High level of the sector synchronization signal Ss indicative of the lead timing of the test record region. Thus, if it is determined that the location timing data TM is updated (step S2: YES), at a time t20 that is a timing when the location timing data TM becomes 0, as shown in FIG. 16, 0 is outputted to the address terminal of the port 2 of the dual port memory 43 (refer to a timing at a time t20 in FIG. 16 (b)). Next, it is determined whether or not the location timing data TM is equal to or more than 16 (step S3). Here, since the location timing data TM is 0 (step S3: NO), the control judging section 19 outputs the power set value to a data bus connected to the data terminal of the port 2 of the dual port memory 43 (step S4). The power set value is divided into 16 steps or stages from the values Step 1 to Step 16 in response to the location timing data TM 0 to 15 and stored in the memory within the control judging section 19. Since, the location timing data TM is 0, the value Step 1 is outputted as the power set value (refer to a timing at a time t20 in FIG. 16(c)). Then, the write signal of rising to the High level is outputted to the write terminal of the dual port memory 43 (refer to a timing at a time t20 in FIG. 16(g), at a step S5). Hence, the value Step 1 is written to the region of the address value 0 of the dual port memory 43, as the power set value (refer to FIG. 7). At this time, the value 0 of the location timing data TM is also outputted to the address terminal of the port 1 (refer to a timing at a time t20 in FIG. 16(d)). Thus, a read out signal to be sent to the read terminal of the port 1 is set to be in an enabling state of the High level (step S6), at a time t21 after an elapse of a predetermined time after the power set value is written (refer to FIG. 16). Accordingly, the power set value Step 1 stored in the region of the address value 0 is read out to the data terminal of the port 1 (refer to FIG. 16(e)), and is outputted to the record current generator 17 as the power set value PD. As a result, the record data WD is recorded into the unit test record region of the region number 0, at the record power corresponding to the power set value Step 1. This output of the data terminal of the port 1 is also sent to the control judging section 19. It is determined by the control judging section 19 whether or not the power set value to be read out is stored in the dual port memory 43 (step S7). This reason is to stop the operation of reading out from the dual port memory 43 if the power set value is not stored in the regions of the address values 16 to 25 of the dual port memory 43. However, since the value Step 1 is stored as the power set value (step S7: YES), the processes from the step S2 are repeated. Thus, if the defect is not detected, hereafter, the power set values Step 2 to Step 16 are written to or read out from the regions of the address values 1 to 15 of the dual port memory 43 in accordance with the fact that the location timing data TM are updated from 1 to 15, and outputted to the record current generator 17. As a result, the record data WD is recorded into the unit test record region of the region numbers 1 to 15, at the record power corresponding to those power set values. If the location timing data TM is updated to 17 (step S2: YES), YES is determined at the step S3. The process of writing the power set value is not executed at the steps S4 and S5. Thus, the regions of the address values 16 to 25 of the dual port memory 43 are kept in the initial set value 0. As a result, it is determined at the step S7 that the power set value to be read out is not outputted from the data terminal of the port 1 (step S7: NO). The read out signal to be outputted to the read terminal of the port 1 is switched to the Low level and is set to be in a disabling state, and the operation of recording the record data on the test record region is ended. Then, in this way, the record data is reproduced which serves as the test signal recorded on the respective unit test record regions of the region numbers 0 to 15. The reproduction signal RF is sent to the asymmetry measuring section 18. The peak value and the bottom value of the reproduction signal RF with respect to the data of 3T and 11T in each unit test record region are respectively measured by the asymmetry measuring section 18. The power set value used in recording on the unit test record region in which the asymmetry value becomes 0 is selected as the optimal power set value by the control judging section 19.

Figure 15B:
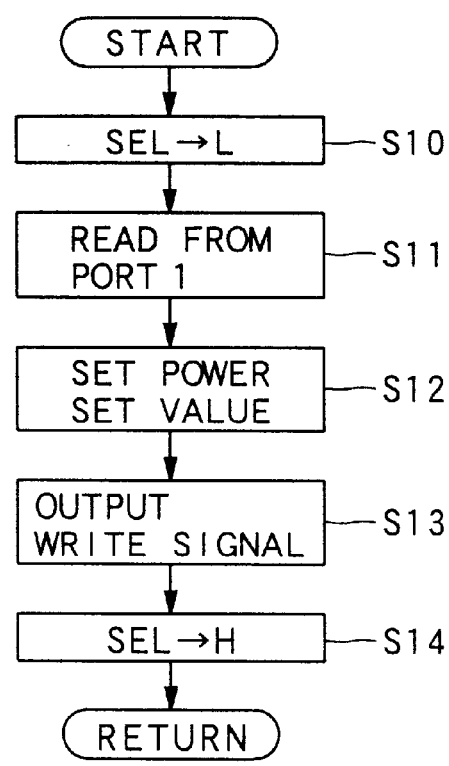
FIG. 15B is a flowchart showing an interrupting routine in the process of outputting the power set data in the power calibration process when the defect is detected, in the first embodiment of the present invention.

On the other hand, if the defect is detected by the defect detector 21 and further the defect detection signal DF of rising to the High level is outputted to the control judging section 19 (refer to a timing at a time t22 in FIG. 16(*i*)), an interruption process is executed as shown in FIG. 15B. At first, the select signal to be sent to the selector terminal of the selector 42 is switched to the Low level (refer to a timing at a time t22 in FIG. 16(*f*), at a step S10). As a result, instead of the location timing data TM, an output value of the counter 40 is sent to the address terminal of the port 2. Since the output value of the counter 40 is 16 of the initial value (refer to FIG. 16 (*j*)), 16 is outputted to the address terminal of the port 2 (refer to a timing at a time t22 in FIG. 16(*b*)). Then, a power set value at this time is read out from the data terminal of the port 1 (step S11), and is set for the data terminal of the port 2 (step S12), and the write signal of rising to the High level is outputted to the write terminal of the port 2 (refer to a timing at a time t23 in FIG. 16(*g*), at a step S13). As a result, the power set value Step 2 to be written to the region of the address value 1 of the dual port memory 43 is written not only to the region of the address value 1 but also to the region of the address value 16. However, since the location timing data TM 1 is outputted to the address terminal of the port 1 at this time, the power set value to be read out is only the power set value written to the region of the address value 1. The power set value written to the region of the address value 16 is read out when the value of the location timing data TM becomes 16 (refer to a timing at a time t25 in FIG. 16). As a result, the record data is recorded on the unit test record region of the region number 16, at the record power corresponding to the power set value Step 2. Also, after the power set value Step 2 is written to the region of the address value 16 as mentioned above, the select signal to be outputted to the selector terminal of the selector 42 is switched back to the High level (refer to a timing at a time t24 in FIG. 16(*f*), at a step S14), and the interruption process is ended. In addition, the output value of the counter 40 is counted up to 17 at a timing when the defect detection signal DF drops to the Low level (refer to a timing at a time t26 in FIG. 16(*j*)). In the example shown in FIG. 16, such an interruption process is executed also when the location timing data TM becomes 4. The power set value Step 5 at this time is written not only to the region of the address value 4 but also to the address value 17.

As mentioned above, in this embodiment, if the defect is detected, the power set value at that time is written not only to the regions of the address values 0 to 15 which are the primary write regions of the dual port memory 43, but also to the regions of the address values 16 to 25 which are the save regions. As a result, the record data is not only recorded in the unit test record region in which the defect is detected, at the record power corresponding to the power set value at that time, but also written in the unit test record regions of the region numbers 16 to 25 which are the save regions. If reproducing from the test record region on which such a recording operation has been performed, the appropriate reproduction signal corresponding to the power set value cannot be obtained from the unit test record region on which the defect is present, because of the influence of the defect. However, the appropriate reproduction signal corresponding to the power set value can be obtained from the unit test record region serving as one example of the save region on which the defect is not present. For example, in a case of the example in FIG. 16, the reproduction signal RF corresponding to the power set value Step 2 cannot be obtained even if reproducing from the unit test record region of the region number 1 on which the defect is present. However, the reproduction signal RF corresponding to the power set value Step 2 can be obtained from the unit test record region of the region number 16 on which the defect is not present. Thus, even if the defect is present, the power set value can be correctly evaluated to thereby select the power set value optimal for the information recording apparatus and the record medium. Also, the operation of recording on the save region in the test record region is limited to the case in which the defect is present. Moreover, the record data of the unit test record region on which the defect is not absent is used for the evaluation as it is. Hence, the laser power calibration process can be carried out in a predetermined short test record region to thereby save the test record region. It is also possible to shorten a time necessary for the laser power calibration process.

In the above-mentioned description, the outputs of write pulse signals serving as one example of the signals to read out the data to be recorded on the save region within the test record region in the dual port memory 43 from the port P1 and write it to the port P2 and write it to the write terminal of the dual port memory 43 are all carried out by the control judging section 19, if the defect is present. However, a very fast processing speed is required of the control judging section 19, under the above-mentioned configuration. In order to reduce a load of the control judging section 19, the power set memory 14 can have the configuration as shown in FIG. 17.

Figure 17:
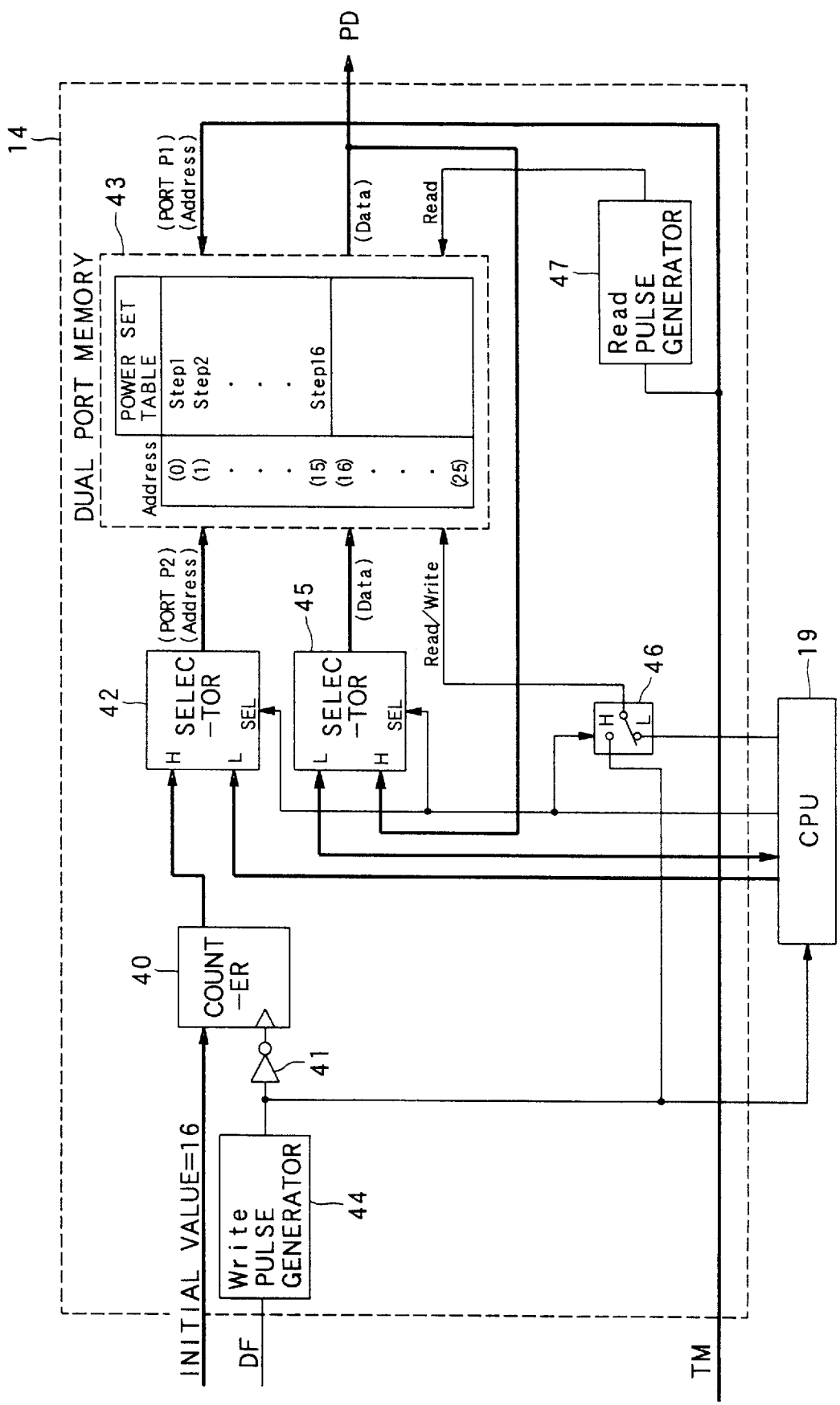
FIG. 17 is a block diagram showing another example of the configuration of the power set memory in the information recording apparatus of FIG. 3.

FIG. 17 is a block diagram showing another configuration of the power set memory 14 corresponding to FIG. 7. It is different from the configuration shown in FIG. 7, in that the power set memory 14 is provided with a write pulse generator 44, a selector 45, a selector 46 and a read pulse generator 47. The write pulse generator 44 is a circuit for generating a write pulse signal having a predetermined width serving as one example of the write signal, in synchronization with a timing when the defect detection signal DF rises from the Low level to the High level. The write pulse signal outputted by this write pulse generator 44 is sent to an inverter circuit 41 connected to a counter 40 and a High input terminal of the selector 46. The write pulse signal outputted by the control judging section 19 is sent to the other Low input terminal of the selector 46. The write pulse signal to be sent to either one of the input terminals is selected in accordance with a select signal similarly outputted from the control judging section 19 to the selector 46, and is then sent to a write terminal of a dual port memory 43. In the configuration shown in FIG. 17, the select signal of the Low level is outputted from the control judging section 19 to the selector 46 at a time of an initial setting immediately after a power supply is turned on and the like. The supply of the write pulse signal to the write terminal of the dual port memory 43 is carried out by the control judging section 19. On the other hand, the select signal of the High level is outputted from the control judging section 19 to the selector 46, at a time of a usual operation. Thus, the supply of the write pulse signal to the write terminal of the dual port memory 43 is carried out by the write pulse generator 44.

The selector 45 is a circuit for selecting a supply source of data to a data terminal of the port P2 in the dual port memory 43. Data from the control judging section 19 is sent to the Low input terminal of the selector 45, as the data of the supply source. Also, the output data of the port P1 in the dual port memory 43 is sent to the High input terminal of the selector 45. The select signal sent from the control judging section 19 to the selector 45 is common to the select signal sent to the selector 46. Thus, if the select signal of the Low level is outputted from the control judging section 19 to the selector 45 at the time of the initial setting immediately after the power supply is turned on and the like, the supply of the data to the data terminal of the dual port memory 43 is carried out by the control judging section 19. At the time of the usual operation, the select signal of the High level is outputted from the control judging section 19 to the selector 45. Hence, the output data of the port P1 of the dual port memory 43 is sent to the data terminal of the port P2 of the dual port memory 43, as it is.

The selector 42 for selecting the data which is the source of the address data of the port P2 in the dual port memory 43 is also provided in the configuration shown in FIG. 7. Although either one of the output value of the counter 40 and the value of the location timing data TM is selected as the address data in the configuration shown in FIG. 7, in the configuration shown in FIG. 17, either one of the output value of the counter 40 and the address data outputted by the control judging section 19 is selected as the address data of the port P2 in the dual port memory 43. Also, the select signal sent from the control judging section 19 to this selector 42 is common to the above-mentioned select signal sent to the selectors 45 and 46. Thus, if the select signal of the Low level is outputted from the control judging section 19 to the selector 42 at the time of the initial setting immediately after the power supply is turned on and the like, the supply of the address data to the address terminal of the port P2 in the dual port memory 43 is carried out by the control judging section 19. At the time of the usual operation, the select signal of the High level is outputted from the control judging section 19 to the selector 42. Hence, the output value of the counter 16 is sent to the address terminal of the port P2 in the dual port memory 43.

The read pulse generator 47 is a circuit for detecting the switching of the value of the location timing data TM and then generating the read pulse signal in synchronization with the detected timing. Each time the value of the location timing data TM is updated, the read pulse generator 47 reads in the power set value in the region represented by the address value which is the value of the location timing data TM. Accordingly, the power set value is outputted from the data terminal of the port P1.

In the power set memory 14 having the above-mentioned configuration shown in FIG. 17, the select signal of the Low level is sent from the control judging section 19 to the selectors 42, 45 and 46, at the time of the initial setting immediately after the power supply is turned on and the like. Thus, in this case, the power set values Step 1 to Step 16 are written from the port P2 in the dual port memory 43, in accordance with the write pulse signal, the address data and the write data outputted by the control judging section 19.

On the other hand, at the time of the usual operation, the select signal of the High level is sent from the control judging section 19 to the selectors 42, 45 and 46. Thus, in this case, if the write pulse signal of rising to the High level is outputted by the write pulse generator 44, namely, only if the defect is detected, the data is written to the port P2 in the dual port memory 43. On the contrary, the read pulse signal is outputted from the read pulse generator 47 to the read terminal of the port P1, on the basis of the location timing data TM. Hence, the power set values Step 1 to Step 16 are outputted from the data terminal of the port P1 as the power set data PD, and the data is recorded on the record region for the test of the DVD-R 1, at the record power corresponding to the power set value. However, if the defect is detected, the write pulse signal is outputted by the write pulse generator 44. At this timing, the output data of the port P1 is sent to the data terminal of the port 2 as it is. Then, the output value of the counter 40 is sent to the address terminal of the port P2. For example, when the value of the location timing data TM is "1", the writing operation is performed on an optical disc in accordance with the power set value Step 2. However, if the defect is detected at this time, the power set data PD of the value Step 2 being outputted from the data terminal of the port P1 at this time is outputted to the data terminal of the port P2, and the power set value Step 2 is written to the region of the address of 16 which is the initial value of the counter 40. In this way, the output of each signal and data to the dual port memory 43 when the defect is detected is carried out by a hardware circuit without the intervention of the control judging section 19. Therefore, it is possible to reduce the load of the process to the control judging section 19.

(II) Second Embodiment

Figure 18:
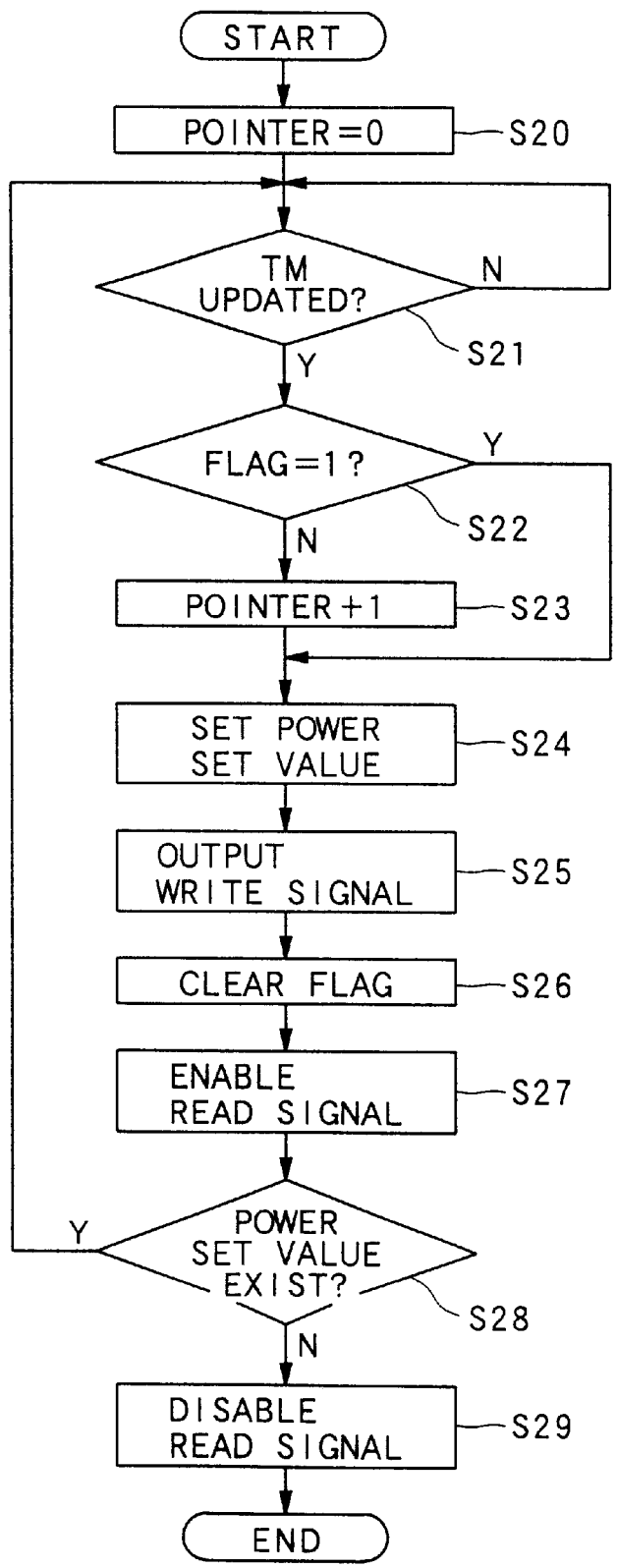
FIG. 18 is a flowchart showing a process of outputting power set data in a power calibration process in a second embodiment of the present invention.

A second embodiment in the present invention will be described below with reference to FIGS. 18 to 20.

In this embodiment, the record data based on a predetermined power set value when the defect is detected is not recorded in the save region within the test record region. It is recorded in a unit test record region adjacent to a unit test record region in which the defect is detected.

In this embodiment, the power set values Step 1 to Step 16 are stored in the memory within the control judging section 19, in response to the address values, as shown in FIG. 19. Also, the control judging section 19 is designed so as to use a part of the memory as a pointer and then read out a power set value of an address value agreeing with a value represented by the pointer and further output it to a data terminal of the port 2 in the dual port memory 43.

Also, in this embodiment, the counter 40 and the selector 42 shown in FIG. 7 are omitted, and the location timing data TM is outputted to the address terminal of the port 2 in the dual port memory 43. A process of saving the power set value in this embodiment will be described below with reference to a flowchart shown in FIG. 18.

When the power calibration process is started, at first, the control judging section 19 initializes the value of the pointer to "0" (step S20). Next, it is determined whether or not the location timing data TM is updated (step S21). If the location timing data TM is updated (step S21: YES), it is determined whether or not the flag is "1" (step S22). This flag is set to "1" when the defect detection signal DF rises to the High level, as shown at a timing of a time t30 in FIG. 20.

Figure 20:
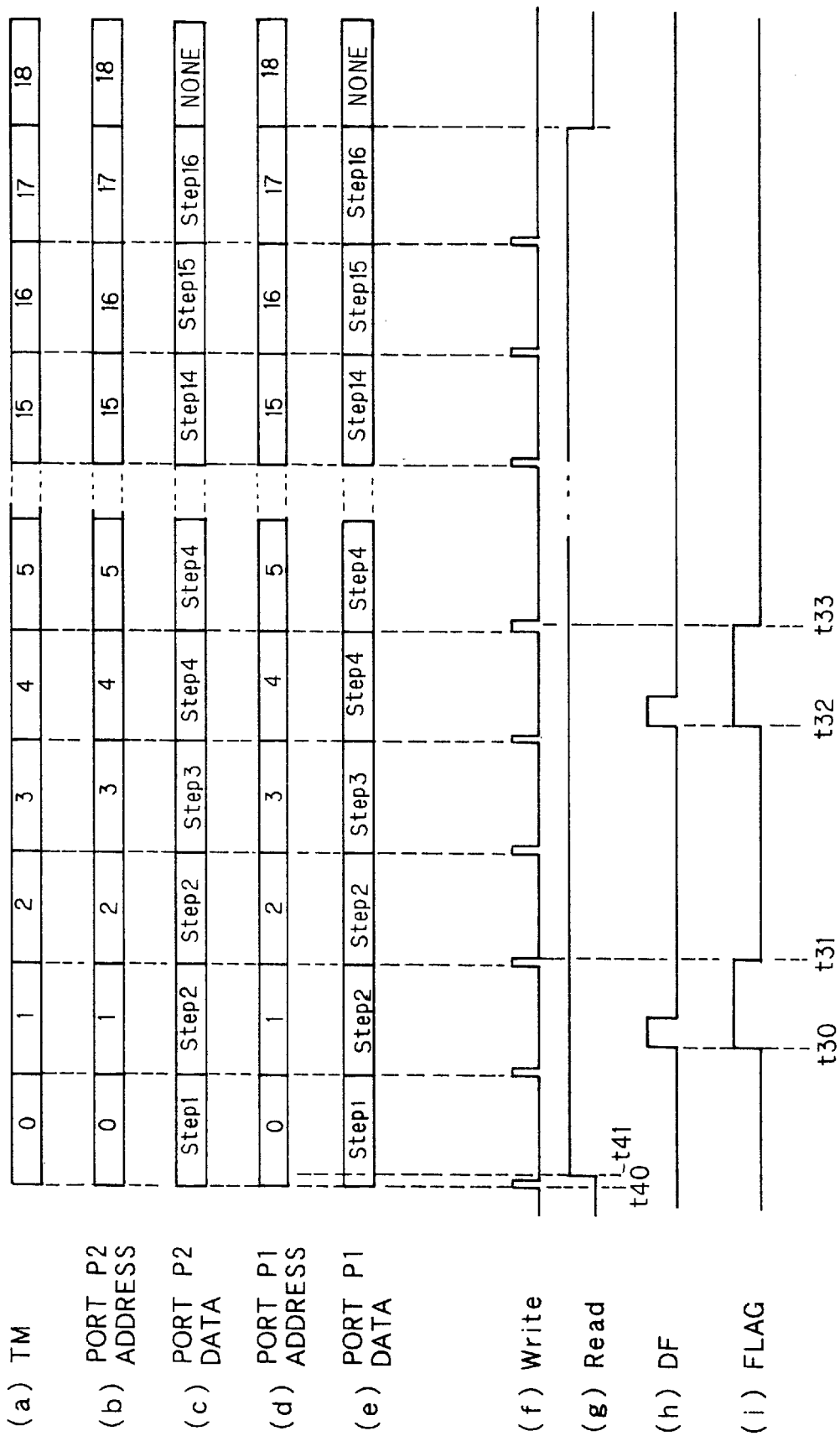
FIG. 20 is a timing chart showing the operations of the power set memory in the process of outputting the power set data in the second embodiment of the present invention.

In FIG. 20, there are shown the location timing data TM (a) sent to the dual port memory 43, an address signal (b) inputted to the port 2 of the dual port memory 43, a data signal (c) inputted to the port 2, an address signal (d) inputted to the port 1, a data signal (e) inputted to the port 1, a write signal (f) inputted to the port 1, a read out signal (g) inputted to the port 1, a defect detection signal DF (h) inputted to the control judging section 19, and a flag (i) operated within the control judging section 19.

If this flag is not "1" (step S22: NO), the value of the pointer is increased by 1 (step S23). The power set value of the address value equal to the value of the pointer is read out from the inner memory, and is set for a data bus of the port 1 (step S24). For example, in an example in FIG. 20, since the flag is not "1" at a timing of a time t40, the power set value Step 1 stored in a region of an address value 0 equal to the value of the pointer is set and written into a region of an address value 0 in the dual port memory 43 (step S25). Then, the flag is cleared (step S26). Here, the flag is kept 0. Next, the read out signal to be outputted to the read terminal of the port 1 is switched to the High level and is set to be in the enabling state (refer to a timing at a time t40 in FIG. 20). Accordingly, similarly to the first embodiment, the record data of the record power corresponding to the power set value Step 1 is recorded in a unit test record region of an region number 0. Similarly, if the location timing data TM becomes 1, the power set value Step 2 is written into a region of an address value 1 in the dual port memory 43, and the record data of the record power corresponding to the power set value Step 2 is recorded in a unit test record region of an region number 1. However, if the defect is detected at a timing of a time t30 when the record data is recorded as shown in FIG. 20 and the defect detection signal DF rises to the High level, the flag is set to "1". If the location timing data TM is updated to 2 (step S21: YES), YES is determined at a step S22 that is a routine of determining a flag, and the power set value is set (step S24). Since the step S23 of increasing the value of the pointer by 1 is omitted at this time, the value of the pointer is kept 2. Thus, the set power set value is kept in the value Step 2. Then, the power set value Step 2 is written into the region of the address value 2 in the dual port memory 43 (step S25). Thus, since the power set value Step 2 written into the region of the address value 2 is read out in this way, the record data is written into the unit test record region of the region number 2 as well as the unit test record region of the region number 1, at the record power corresponding to the power set value Step 2. In addition, the flag is cleared after the power set value is written into the dual port memory 43 (refer to a timing at a time t31 in FIG. 20, at a step S26).

Hereafter, the above-mentioned processes are repeated. Then, the power set values up to the value Step 16 are written to the dual port memory 43. Also, the record data is recorded on each unit test record region, at the record power corresponding to each power set value. In the example of FIG. 20, the defect is detected even at a timing of a time t32, and the power set value Step 4 is written to the region of the address value 5 in the dual port memory 43 at a timing of a time t33. Also, the record data is recorded on the unit test record region of the region number 5, at the record power corresponding to the power set value Step 4. When the location timing data TM becomes 18, the value of the pointer becomes 17. However, the power set value is not present in an address value corresponding to this value. Thus, the control judging section 19 outputs 0 to a data bus of the port 1. As a result, it is determined that there is no power set value to be read out (step S28). Hence, the read out signal is disabled (step S29), and the process of reading out the power set value is ended.

This embodiment has the above-mentioned configuration. Thus, even if the defect is present on the predetermined unit test record region, the record data can be recorded in a unit test record region adjacent to the unit test record region, at the record power based on the predetermined power set value, and the optimal power set value can be properly selected. Moreover, it is possible to save the test record region and also possible to shorten the calibration process.

The above-mentioned respective embodiments have the configuration in which the power set value is read out immediately after the power set value is written to the dual port memory. However, the present invention is not limited to them. For example, at the time of the initial setting prior to the start of the power calibration process and the like, after the power set values Step 1 to Step 16 are written to the dual port memory, only the operation of reading out the power set values and the saving process at the time of the defect detection may be carried out in the power calibration process. Also, the manner of dividing the power set values into the values of 16 steps or stages is only the example. It can be suitably changed.

(III) Third Embodiment

Next, a third embodiment of the present invention will be explained with reference to a block diagram of FIG. 21 and a flow chart of FIG. 22.

In each of the above explained embodiments, although the power set value is saved into the save region in the dual port memory only when the defect is detected so as to record the data into the save region on the DVD-R by use of the power set value, the recording operation with the optimal record power is not performed in the test record area not only when detecting the defect but also when the abnormal condition in the servo system e.g., the external disturbance is generated while recording the data. Therefore, in the present embodiment, not only when the defect is detected but also when the external disturbance is generated, it is performed to save the power set value into the save region of the dual port memory and record the data into the save region on the DVD-R by use of the power set value.

Further in the present embodiment, recording the data into the test record area and reading the data are not performed in parallel. Instead, the present embodiment is constructed such that, after recording the data into all of the test record area is finished, reading the data from respective test record regions is performed and that the external disturbance or the defect is detected, so as to perform the re-recording process with respect to the save region in case of detecting the disturbance or defect.

Figure 21:
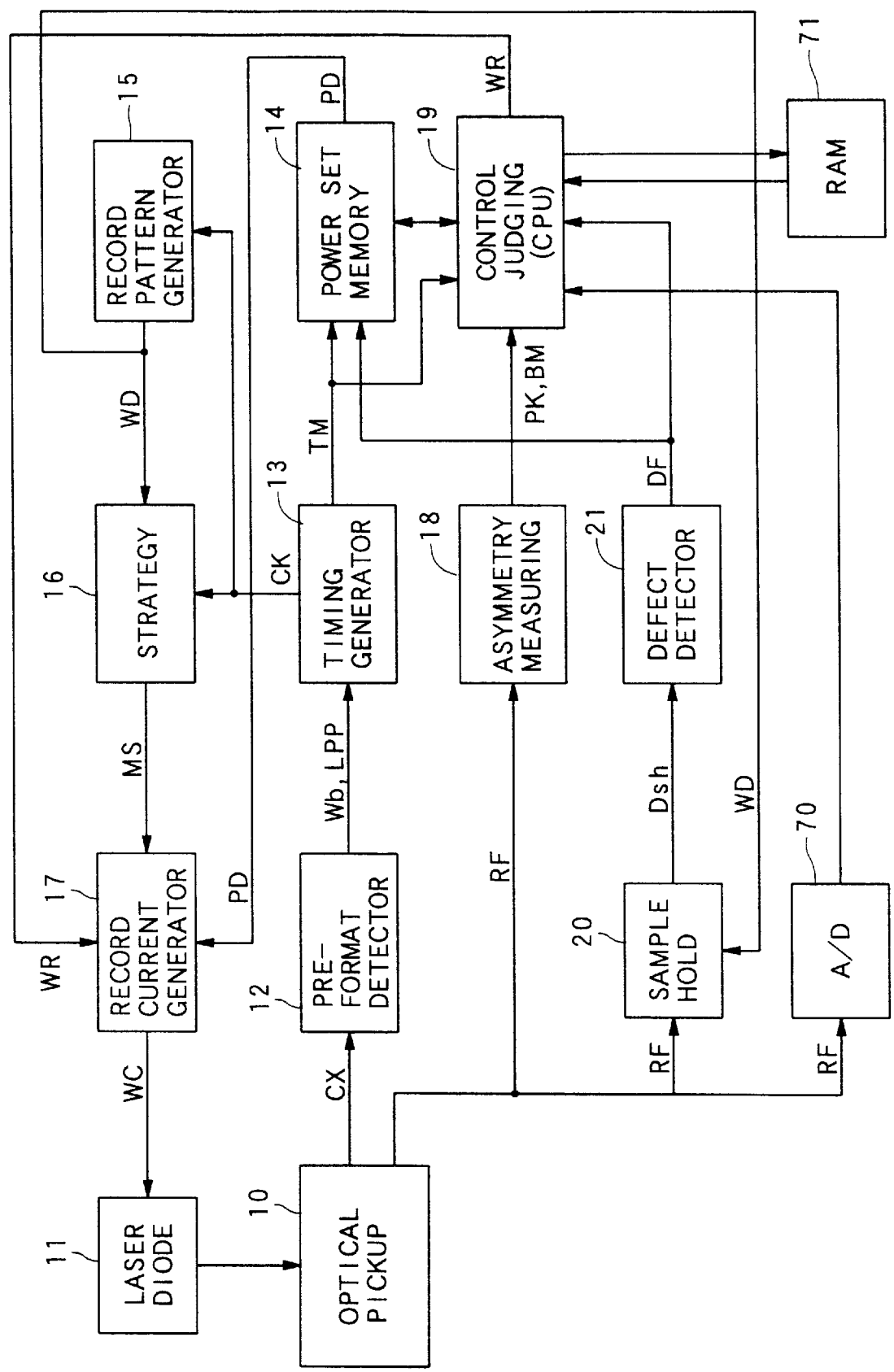
FIG. 21 is a block diagram showing a schematic configuration of an information recording apparatus as a third embodiment of the present invention.

FIG. 21 is a block diagram of the information recording apparatus of the present embodiment.

As shown in FIG. 21, the information recording apparatus of the present invention is different from the first embodiment shown in FIG. 3 in that it is provided with an A/D convertor 70 for A/D-converting the output from the optical pickup 10 and a RAM 71 for storing the data after the A/D conversion.

Hereinbelow, the laser power calibration process in the present embodiment is explained with reference to the block diagram of FIG. 21 and the flow chart of FIG. 22.

Figure 22:
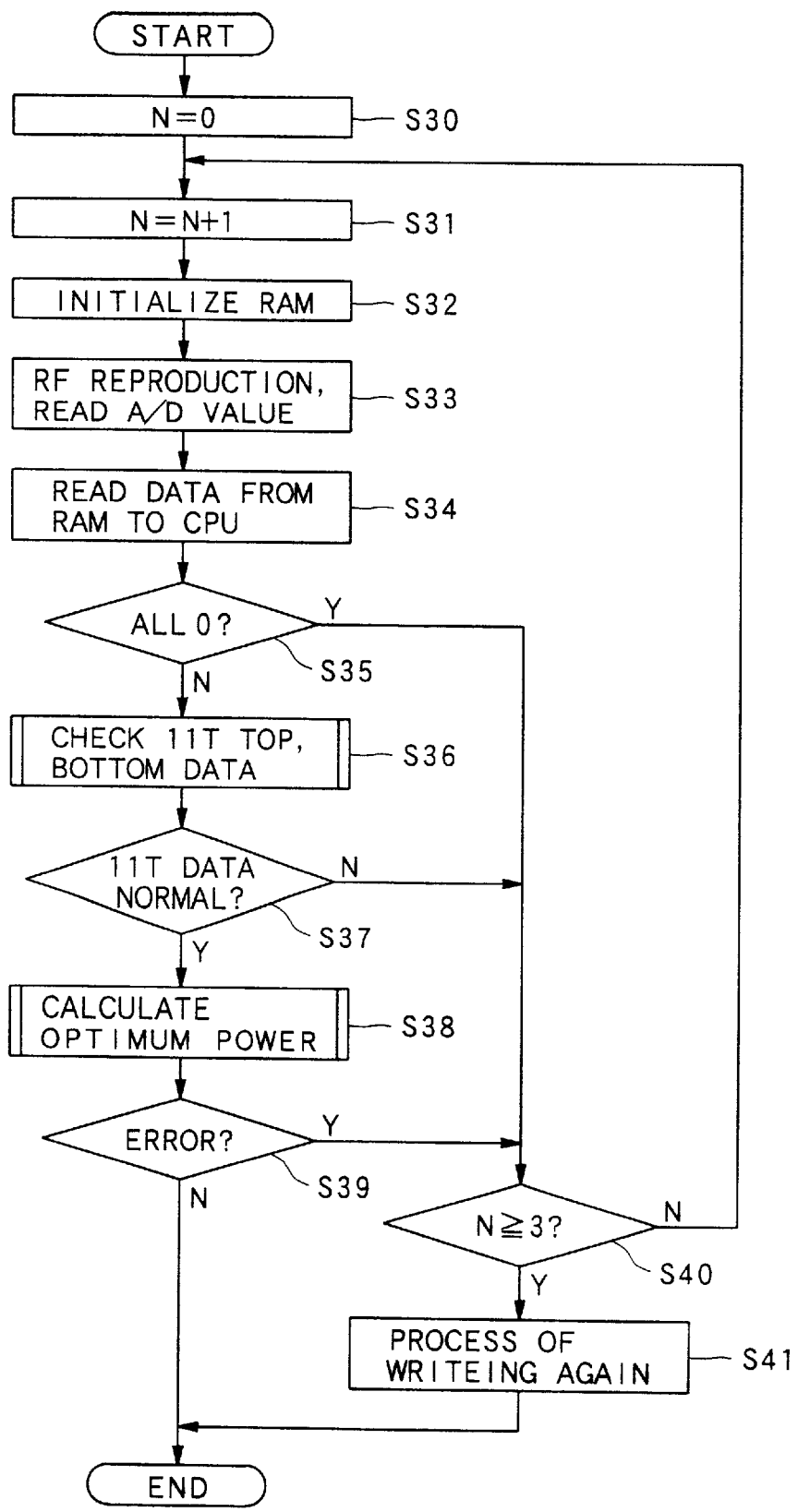
FIG. 22 is a flowchart showing a laser power calibration process performed in the information recording apparatus of FIG. 21.

In the present embodiment, the power set values Step 1 to Step 16 are written into the areas having the address values 0 to 15 in the dual port memory 43 in synchronization with the location timing data TM and the record data WD based on these power set values are recorded into the test record region of the DVD-R 1 in synchronization with the location timing data TM, in the same manner as the first embodiment although it is not shown in the flow chart of FIG. 22. In addition, the defect detection is not performed at this time of recording.

When the above mentioned recording operation is finished, the CPU 19 initializes the value of the internal counter N to 0 as shown in FIG. 22 (step S30). Then, after incrementing the counter N (step S31), it initializes the RAM 71 so as to reset all of the values therein to 0 for example (step S32). Then, the reproduction of the test record region is started, the reproduction output RF from the optical pickup 10 is read in through the A/D convertor 70, and all of the data recorded in the test record region is stored into the RAM 71 (step S33).

Next, the CPU 19 sequentially read the data from the RAM 71 (step S34), and judges whether or not all of the data are 0 (step S35). Such a condition is generated when the normal recording operation could not be performed due to an abnormality of the servo system at the time of recording. Further, it is generated when the defect of the drop of the pigment is generated. In such a condition, since it is not possible to obtain the normal record data, the re-writing or retrying operation with respect to the save region of the DVD-R 1 is to be performed. In the present embodiment, the re-trying operation is performed 3 times for caution's sake (the step S35: YES to the step S40: NO to the step S31). The re-trying operation is started after the location timing data TM is returned to 0 again, and the above mentioned processes from the step 31 to the step S35 are repeated.

Then, even if the 3 times re-trying operations have been performed, if it is judged that all of the data are 0 (the step S35: Y to the step S40: YES), the re-writing process is performed (step S41). The re-writing process is performed such that the power set value is stored in the save region in the dual port memory 43, in synchronization with the location timing data TM in the same manner as the first embodiment.

On the other hand, if it is judged that all of the data are not 0 (step S35: NO), it is performed to check the difference between the bottom value and the peak value of the 11T data among the data stored in the RAM 71 (step S36). If the normal recording operation is performed, the width of the 11T data have a constant value as shown in FIG. 11. However, when the abnormality of the servo system or the like is generated, the width of the 11T data is suddenly changed, so that only the 11T data in one unit test record region takes the value which is much smaller than that of another 11T data. Alternatively, the 11T data may take small values over the whole of the test record region. Therefore, it is possible to judge whether or not the normal recording operation has been performed, by checking the presence or absence of such a sudden change of the 11T data or checking the presence or absence of an abnormality in the value.

More concretely, it is constructed such that the CPU 19 judges that the normal recording operation has been performed if the A/D converted value of the 11T data is within a predetermined range with respect to the full-scale value of the A/D conversion.

As a result of the above mentioned checking operation, if it is silo judged that the 11T data is not normally recorded (step S37: NO), the re-trying operation is performed 3 times for caution's sake (step S40). Then, if the 11T data is not normally recorded after the 3 times re-trying operation (the step S37: NO to the step S40: YES), the rewriting process is performed in the above mentioned manner (step S41).

Next, if it is judged that the 11T data is normally recorded (step S37: YES), the calculation of the optimal power is performed on the basis of the output value of the sample hold circuit 20 in the same manner as the first embodiment (step S38). Then, if the detection of the above mentioned defect is done during this calculation procedure (step S39), the re-trying operations are performed 3 times (step S40). Then, if the defect is detected after the 3 times re-trying operations (the step S39: YES to the step S40: YES), the re-writing process is performed in the above mentioned manner (step S41).

As described above, according to the present embodiment, not only when the defect is detected but also when the normal recording operation is not performed into the test record region of the DVD-R due to the abnormality of the servo system e.g., the generation of the external disturbance, it is performed to record the data based on the predetermined power set value with respect to the save region of the DVD-R. Hence, it is possible to perform the selection of the optimal power.

The example in which the writable DVD of the organic type pigment type has been described in the above-mentioned embodiments. However, it may be applied to the writable DVD of the phase change type or the magneto-optical type.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-211097 filed on Jul. $27^{th}$, 1998 including the specification, claims, drawings and summary is incorporated herein by reference in its entirety.

What is claimed is:

1. An information recording apparatus, in which before information is recorded onto an information record medium by irradiating a light beam, a test signal is recorded for each of a plurality of unit test record regions forming a test record region on said information record medium, with a plurality of different record powers, and then said test signal recorded in each of the unit test record regions is reproduced, and further an optimal record power for said light beam is selected on the basis of a condition of said reproduced test signal, said information recording apparatus comprising:

a re-writable memory device for storing power set values to obtain said plurality of different record powers respectively, in response to location information which identifies respective one of said unit test record regions;

a recording device for recording said test signal in said test record region on the basis of a constant record clock signal;

a location information generating device for generating said location information at a cycle corresponding to a record time for each of said unit test record regions;

a record controlling device for reading out said power set value stored in said re-writable memory device in accordance with said generated location information and then outputting said read out power set value to said recording device;

a defect detecting device for detecting a defect in respective one of said unit test record regions, in which a recording operation is performed by said recording device; and a power set value storing device for storing said power set value, which is read out in accordance with one location information by said record controlling device when said defect is detected, into said re-writable memory device such that said stored power set value corresponds to another location information different from said one location information.

2. An information recording apparatus according to claim 1, wherein:

N (N: natural number) different power set values are stored in said re-writable memory device in correspondence with N location information for identifying N unit test record regions respectively; and said power set value storing device stores said power set value into said re-writable memory device such that said stored power set value corresponds to the location information, which identifies $M^{th}$ ($M \geq N+1$) unit test record region, when said defect is detected.

3. An information recording apparatus according to claim 1, wherein:

N (N: natural number) different power set values are stored in said re-writable memory device in correspondence with N location information for identifying N unit test record regions respectively; and said power set value storing device stores said power set value into said re-writable memory device such that said stored power set value corresponds to the location information, which identifies another unit test record region next to one unit test record region in which said defect is detected, when said defect is detected.

4. An information recording apparatus, in which before information is recorded onto an information record medium by irradiating a light beam, a test signal is recorded for each of a plurality of unit test record regions forming a test record region on said information record medium, with a plurality of different record powers, and then said test signal recorded in each of the unit test record regions is reproduced, and further an optimal record power for said light beam is selected on the basis of a condition of said reproduced test signal, said information recording apparatus comprising:

a re-writable memory device for storing power set values to obtain said plurality of different record powers respectively, in response to location information which identifies respective one of said unit test record regions;

a recording device for recording said test signal in said test record region on the basis of a constant record clock signal;

a location information generating device for generating said location information at a cycle corresponding to a record time for each of said unit test record regions;

a record controlling device for reading out said power set value stored in said re-writable memory device in accordance with said generated location information and then outputting said read out power set value to said recording device;

a judging device for reading out a recorded content for respective one of said unit test record regions and judging whether or not a normal recording operation is performed by said recording device; and a power set value storing device for reading out said power set value from said re-writable memory device in accordance with one location information corresponding to the unit test record region if said judging device judges that the normal recording operation is not performed therein, and storing said read out power set value into said re-writable memory device such that said stored power set value corresponds to another location information different from said one location information.

5. An information recording apparatus according to claim 4, wherein:

said record controlling device comprises a device for reading out said power set values and outputting said read out power set values to said recording device as for said plurality of unit test record regions respectively and for performing a re-reading out operation of said power set value and a re-outputting operation to said recording device if said judging device judges that the normal recording operation is not performed; and said judging device comprises a device for reading out the recorded content for respective one of said unit test record regions and judging after said recording device finishes the recording operation with respect to said plurality of unit test record regions by said recording device.

* * * * *